United States Patent
Pathak et al.

(10) Patent No.: US 12,287,816 B1
(45) Date of Patent: Apr. 29, 2025

(54) REDUCING LATENCY BY PROCESSING PARTS OF A LANGUAGE MODEL QUERY IN PARALLEL

(71) Applicant: Microsoft Technology Licensing, LLC, Redmond, WA (US)

(72) Inventors: Sayan Dev Pathak, Kirkland, WA (US); Osama Abuelsorour, Menlo Park, CA (US); Christopher Hakan Basoglu, Everett, WA (US); Harini Kesavamoorthy, Bellevue, WA (US); Girish Milind Mahajan, Redmond, WA (US); Salman Mohammad Quazi, Mountain View, CA (US); Valeriy Viktorovich Kirshin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/385,408

(22) Filed: Oct. 31, 2023

(51) Int. Cl.
*G06F 16/33* (2019.01)
*G06F 16/332* (2019.01)
*G06F 16/3329* (2025.01)
*G06F 16/334* (2025.01)

(52) U.S. Cl.
CPC ...... *G06F 16/3329* (2019.01); *G06F 16/3344* (2019.01)

(58) Field of Classification Search
None
See application file for complete search history.

(56) References Cited

U.S. PATENT DOCUMENTS

| | | | |
|---|---|---|---|
| 9,934,261 B2* | 4/2018 | Kuno | G06F 16/217 |
| 11,308,106 B1* | 4/2022 | Muralimanohar | G06F 16/27 |
| 2011/0228668 A1* | 9/2011 | Pillai | G06F 16/2471 |
| 2013/0125099 A1* | 5/2013 | Budiu | G06F 16/90 |
| 2015/0160817 A1* | 6/2015 | Hwang | G06F 16/9038 |
| | | | 707/E17.014 |
| 2016/0171050 A1* | 6/2016 | Das | G06F 16/90332 |
| | | | 707/718 |

(Continued)

OTHER PUBLICATIONS

Devlin, et al., "BERT: Pre-training of Deep Bidirectional Transformers for Language Understanding," arXiv, arXiv:1810.04805v2 [cs.CL], May 24, 2019, 16 pages.

(Continued)

*Primary Examiner* — Son T Hoang

(57) ABSTRACT

A technique partitions a user's original query into plural smaller component queries, each of which has a common part and an instance-specific part. The technique distributes the component queries to plural processor instances of a processor. The plural processor instances transform the respective component queries into query-component responses by acting in parallel, independent of each other. The technique generates a final response based on the query-component responses, e.g., by assembling the component-query responses into the final response. The technique reduces latency because the processor instances work on parts of the user's original query at the same time, rather than as a single stream of consecutive tokens. The plural processor instances have access to a shared cache memory, and utilize relevant data that has been computed in response to previous queries.

20 Claims, 9 Drawing Sheets

(56) References Cited

U.S. PATENT DOCUMENTS

| | | | |
|---|---|---|---|
| 2021/0217408 | A1 | 7/2021 | Hakkani-Tur et al. |
| 2022/0101189 | A1* | 3/2022 | Ben-Itzhak .......... G06F 16/245 |
| 2023/0177401 | A1* | 6/2023 | Yu .................. G06F 16/2455 |
| 2023/0359619 | A1* | 11/2023 | Sharan ................ G06F 16/283 |
| 2023/0385275 | A1* | 11/2023 | Obeidi ................ G06F 16/243 |

OTHER PUBLICATIONS

Vaswani, et al., "Attention Is All You Need," in 31st Conference on Neural Information Processing Systems (NIPS 2017), 2017, 11 pages.

Radford, et al., "Improving Language Understanding by Generative Pre-Training," available at http://cdn.openai.com/research-covers/language-unsupervised/language_understanding_paper.pdf, OpenAI, San Francisco, California, Jun. 11, 2018, 12 pages.

Touvron, et al., "LLaMA: Open and Efficient Foundation Language Models," arXiv, arXiv:2302.13971v1 [cs.CL], Feb. 27, 2023, 27 pages.

Scao, et al., "BLOOM: A 176B-Parameter Open-Access Multilingual Language Model," arXiv, arXiv:2211.05100v2 [cs.CL], Dec. 11, 2022, 62 pages.

Brown, et al., "Language Models are Few-Shot Learners," arXiv, arXiv:2005.14165v4 [cs.CL], Jul. 22, 2020, 75 pages.

Legenzoff, Derek "Function calling is now available in Azure OpenAI Service," available at read://https_techcommunity.microsoft.com/?url=https%3A%2F%2Ftechcommunity.microsoft.com%2Ft5%2Fazure-ai-services-blog%2Ffunction-calling-is-now-available-in-azure-openai-service%2Fba-p%2F3879241, Azure AI Services Blog, Jul. 20, 2023, 4 pages.

"Extending LLM Context Length," available at https://github.com/abacusai/Long-Context, Github, accessed on Oct. 26, 2023, 12 pages.

"LangChain," available at https://en.wikipedia.org/wiki/LangChain Wikipedia article, accessed on Oct. 26, 2023, 3 pages.

"OpenAPI Specification," available at https://en.wikipedia.org/wiki/OpenAPI_Specification, Wikipedia article, accessed on Oct. 26, 2023, 5 pages.

"How to use function calling with Azure OpenAI Service (Preview)," available at https://learn.microsoft.com/en-us/azure/ai-services/openai/how-to/function-calling, Microsoft Azure documentation, Jul. 20, 2023, 8 pages.

Gupta, "Compression of Deep Learning Models for Text: A Survey," arXiv, arXiv:2008.05221v4 [cs. CL], Jun. 13, 2021, 53 pages.

Chen, et al., "Stabilized In-Context Learning with Pre-trained Language Models for Few Shot Dialogue State Tracking," arXiv, arXiv:2302.05932v1 [cs.CL], Feb. 12, 2023, 14 pages.

Santra, et al., "Frugal Prompting for Dialog Models," arXiv, arXiv:2305.14919v1 [cs.CL], May 24, 2023, 22 pages.

Jacobs, et al., "DeepSpeed Ulysses: System Optimizations for Enabling Training of Extreme Long Sequence Transformer Models," arXiv, arXiv:2309.14509v1 [cs.LG], Sep. 25, 2023, 9 pages.

Li, et al., "LightSeq: Sequence Level Parallelism for Distributed Training of Long Context Transformers," arXiv, arXiv:2310.03294v1 [cs.LG], Oct. 5, 2023, 14 pages.

Li, et al., "Sequence Parallelism: Making 4D Parallelism Possible," arXiv, arXiv:2105.13120v1 [cs.LG], May 26, 2021, 12 pages.

PCT Search Report and Written Opinion for PCT/US2024/049691, identified mailing date of Dec. 17, 2024, 14 pages.

U.S. Appl. No. 18/401,060, filed Dec. 29, 2023.

* cited by examiner

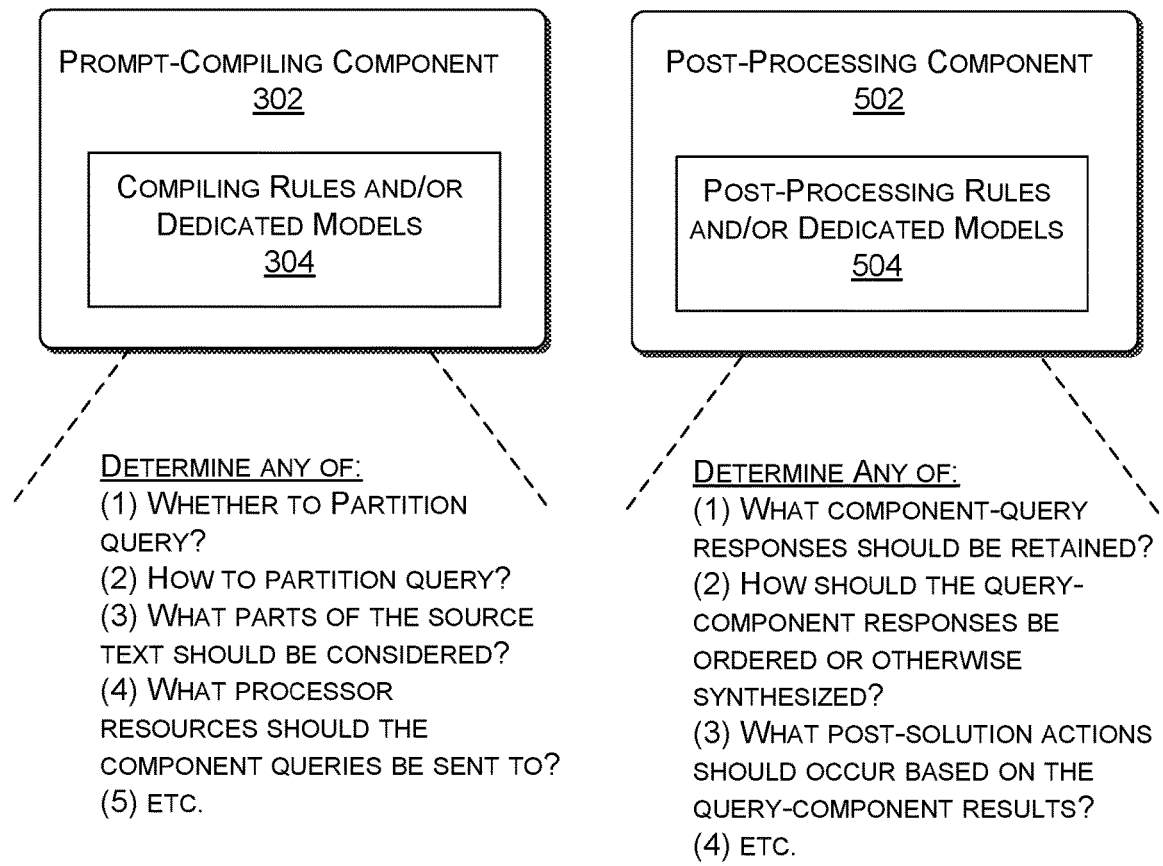
FIG. 3
FIG. 5
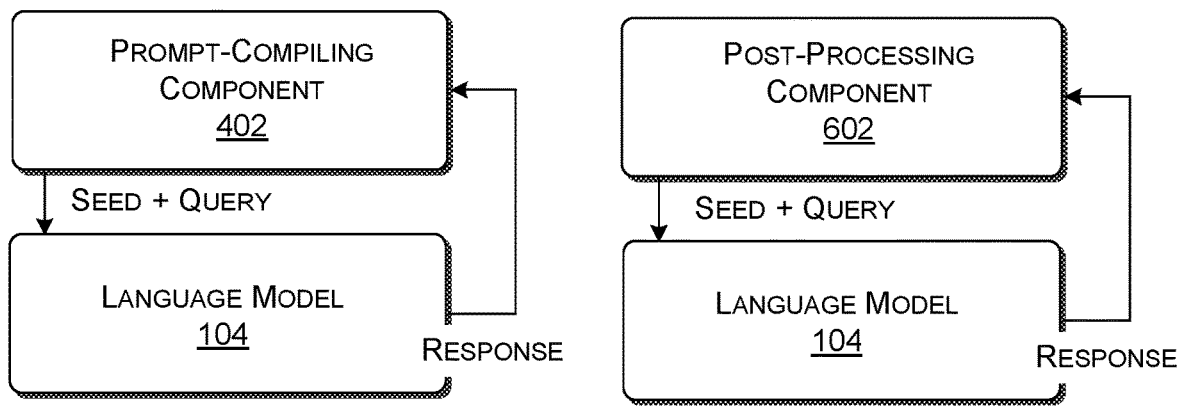
FIG. 4
FIG. 6

OVERVIEW OF THE PROMPT-COMPILING COMPONENT ← 1102

DETERMINE THAT THE QUESTION AND THE SOURCE TEXT ARE CAPABLE OF BEING PARTITIONED INTO COMPONENT QUERIES.
1104

GENERATE THE COMPONENT QUERIES BASED ON THE QUESTION AND THE SOURCE TEXT, THE COMPONENT QUERIES HAVING A SAME COMMON PART THAT EXPRESSES THE QUESTION, AND THE COMPONENT QUERIES EXPRESSING RESPECTIVE SELECTED SOURCE PARTS OF THE SOURCE TEXT.
1106

FIG. 11

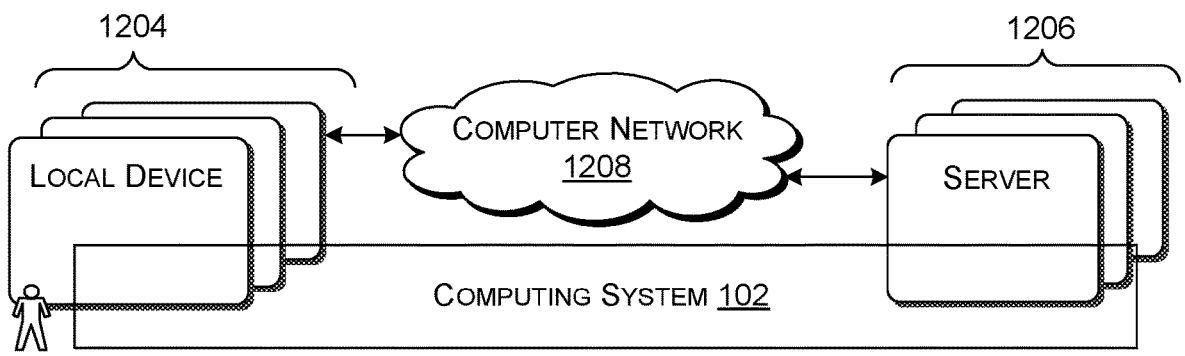

REDUCING LATENCY BY PROCESSING PARTS OF A LANGUAGE MODEL QUERY IN PARALLEL

BACKGROUND

Developers who wish to incorporate the use of machine-trained language models ("language models") into applications face a number of technical challenges. For instance, a language model requires a significant amount of time and resources to transform a user's query into an output response. The resources include processor-related resources (e.g., graphics processing unit resources) and memory. The amount of time and resources grows with the size of the user's submitted query. Further, the quality of the output response sometimes diminishes as the user's query grows longer. These characteristics reduce the viability of language models in applications that demand low-latency and high-quality performance.

SUMMARY

A technique is described herein for reducing the latency at which a language model generates and delivers a response to a user. The technique performs this task by partitioning the user's original query into smaller component queries, each of which has a common part and an instance-specific part. The technique distributes the component queries to plural processor instances of a processor, which have access to a shared cache memory. The plural processor instances transform the respective component queries into query-component responses by acting in parallel, independent of each other. The technique generates a final response based on the query-component responses, e.g., by assembling the child-query responses into the final response. The technique reduces latency because the processor instances work on parts of the user's original query at the same time, rather than as a single stream of consecutive tokens that is processed serially.

According to another technical advantage, an application provides high-quality results by partitioning the original query into the plural component queries. This is because each component query presents query information that focuses on a specific aspect of the original query. A processor instance, to which the component query is assigned, is able to more effectively analyze the relationships between tokens of the component query because it is freed from the noise associated with less relevant parts of the original query, which are not represented by the component query.

According to another technical advantage, the technique allows a user to submit a relatively large query to the language model that might otherwise exceed the prompt-size limits of the language model. This is because the technique partitions a single large query into smaller component queries, each of which individually complies with the prompt-size limits of the language model.

In some implementations, the technique performs preliminary analysis to determine whether the original query is a suitable candidate for parallel processing. In general, an original query that has mutually exclusive query information is a good candidate for parallel processing. In some examples, for instance, a query that contains a list of entities is a good candidate for parallel processing.

In some implementations, the technique seeks to allocate all of the component queries to a single processor. All processor instances associated with the single processor have access to information provided in the shared cache memory.

In some implementations, in performing its individual task, a processor instance makes use of previously-generated intermediary results in the cache memory that are relevant to the individual task. In some implementations, the intermediate results are key-value information used in an attention operation.

The above-summarized technology is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIGS. 3 and 4 show two implementations of a prompt-compiling component, which is one component of the computing system of FIG. 1. The prompt-compiling component partitions the user's original query into plural component queries.

FIGS. 5 and 6 show two implementations of a post-processing component, which is another component in the computing system of FIG. 1. The post-processing component processes component-query responses generated by the processor instances.

FIG. 11 is a flowchart that provides an overview of one manner of operation of a prompt-compiling component, which is part of the computing system of FIG. 1.

FIG. 12 shows computing equipment that, in some implementations, is used to implement the computing system of FIG. 1.

The same numbers are used throughout the disclosure and figures to reference like components and features.

DETAILED DESCRIPTION

Figure 1:
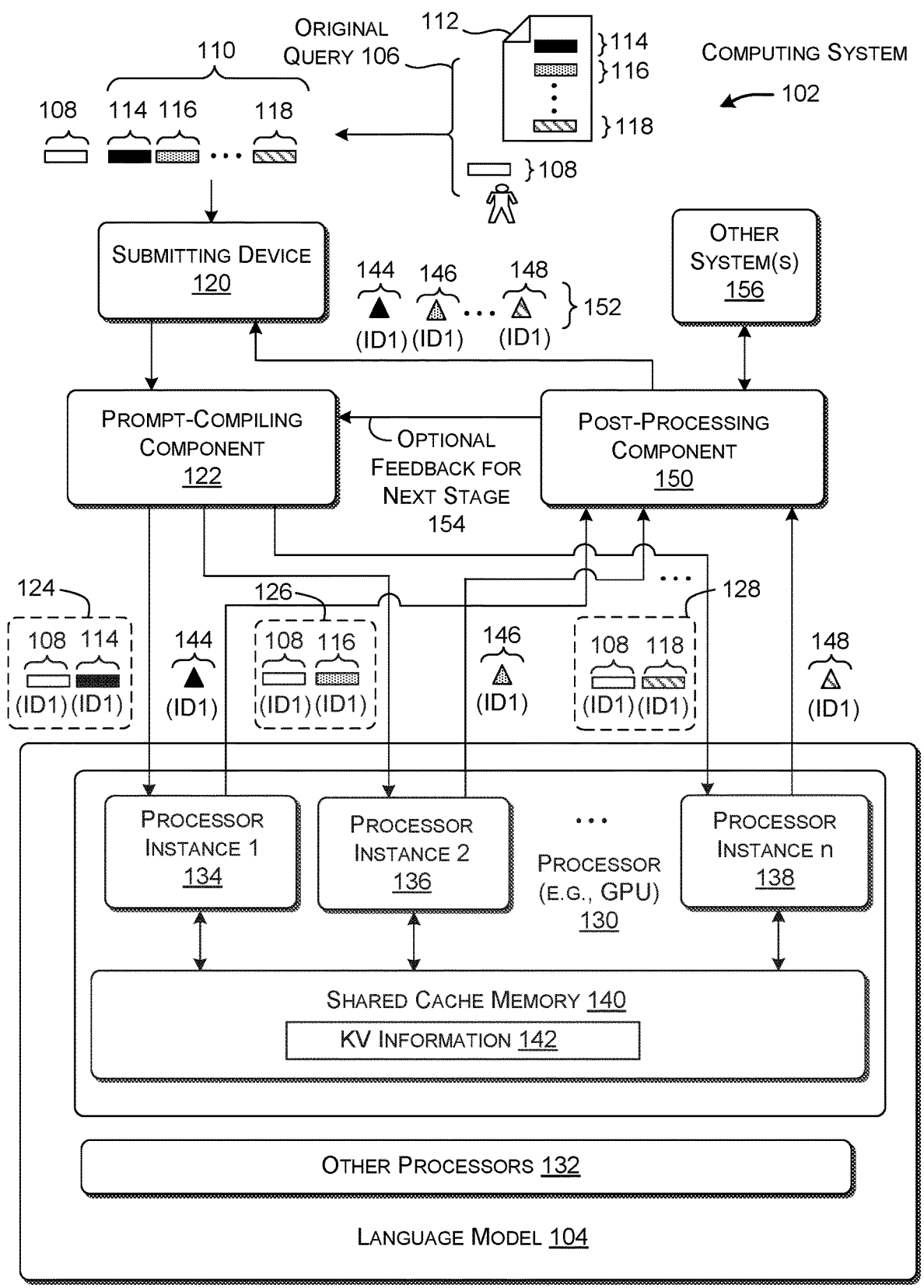
FIG. 1 shows a computing system for processing a user's original query using a machine-trained language model ("language model"). The computing system processes the original query in parallel using plural processor instances.

FIG. 1 shows a computing system 102 for interacting with a machine-trained language model ("language model") 104. By way of overview, the computing system 102 partitions an original query 106 into plural component queries, each of which expresses a part of the original query 106. The computing system 102 processes the component queries in parallel using plural processor resources of the language model 104, to produce plural respective query-component responses. The computing system 102 generates a final response based on the query-component responses, e.g., by assembling the query-component responses into the final response. Alternatively, or in addition, the computing system 102 performs other post-processing synthesis action on the query-component responses, including any of a ranking operation, a data item extraction operation, a classification operation, etc.

The computing system 102 improves the performance of an application that makes use of the language model 104 in at least three respects. First, the computing system 102 reduces the latency at which the language model 104 is able to respond to the original query 106. The computing system 102 achieves this objective by using the plural processor resources of the language model 104 to work on sub-streams of tokens associated with the component queries at the same time, as opposed to using a single process to work on a single string of tokens in serial fashion.

Second, the computing system 102 improves the quality of the language model's response. The computing system 102 achieves this objective because each processor resource performs attention-based processing on a subset of the information imparted by the original query 106. This enables each processor resource to more effectively focus on the subset of information fed to it, e.g., by determining the relationships between tokens that make up the subset of information, without the "distraction" presented by less relevant parts of the original query 106. That is, for the case of a long stream of serially-processed tokens, it is difficult for the language model 104 to accurately assess relations among tokens using an attention operation (described further below with reference to FIG. 9) because the large number of tokens has the effect of diluting the significance of any individual relation (between a particular pair of tokens). This is particularly a problem for tokens that occur in the middle portions of the long stream.

Third, the computing system 102 expands the types of queries that are capable of being successfully processed by the language model 104. More specifically, providers of language models typically allow a user to submit prompts having a prescribed maximum size, such as 8K tokens, 16K tokens, or 32K tokens. The language model 104 will reject a long prompt that exceeds its model-specific limit at the outset. In other cases, the language model 104 will accept the long prompt because it satisfies its prompt-size limit, but eventually reject the long prompt if the language model 104 is unable to generate and deliver a response in a prescribed time-out period (where the time-out period is a provider-specific temporal constraint that is independent of a maximum token limit constraint). The computing system 102 overcomes both of these limitations by partitioning a single long query into plural parts and processing the plural parts in parallel using as many processor resources as is needed or otherwise deemed appropriate. No component query exceeds the prompt-size limits of the language model 104, and therefore none will be rejected. Nor is any component query likely to take longer than the time-out period to perform, since it is reduced in size compared to the original query 106. This capability liberates the computing system 102 to handle lengthy queries that would otherwise be rejected by the language model 104. The long queries, for instance, include lengthy documents or files associated therewith.

Figure 13:
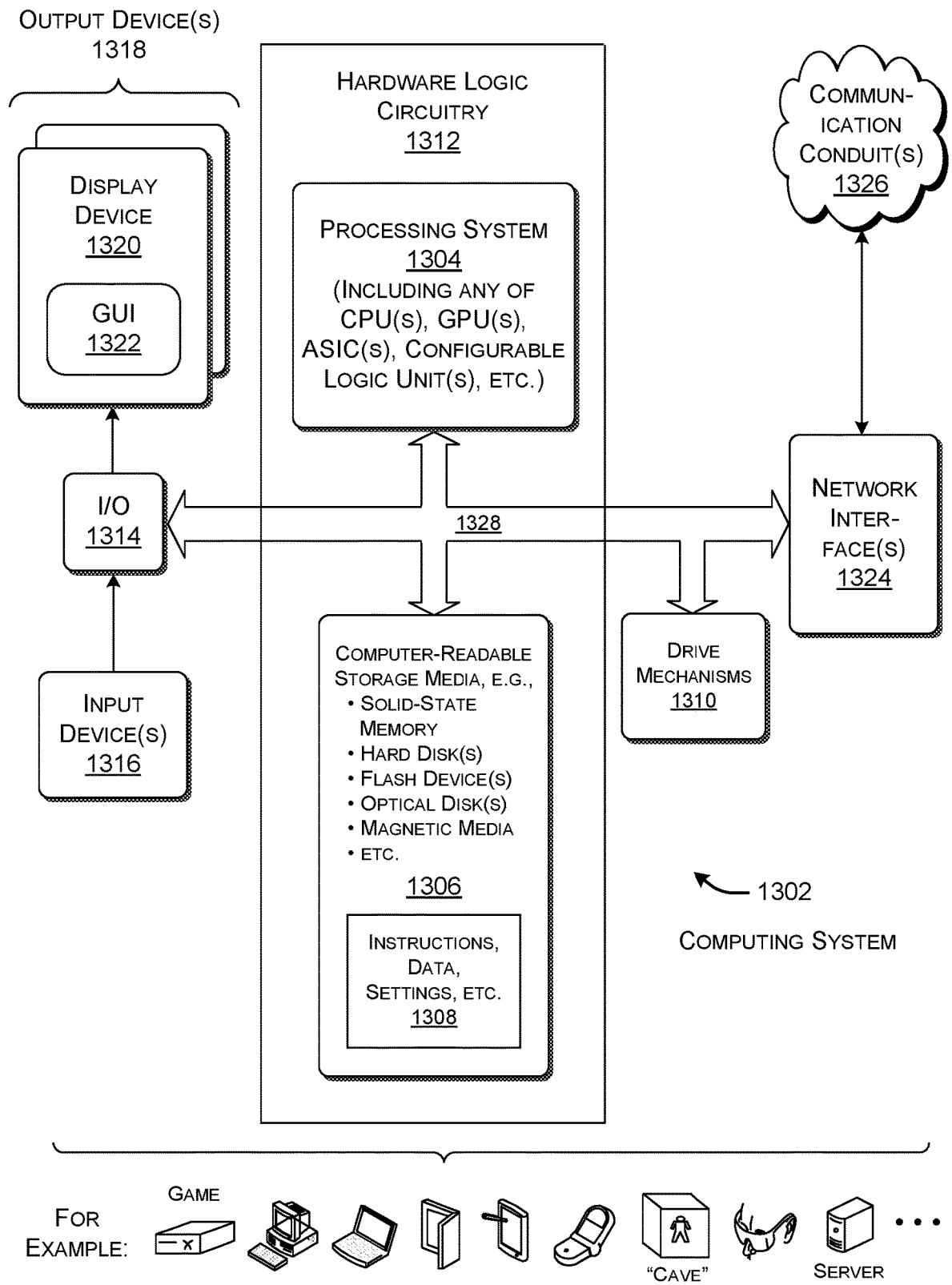
FIG. 13 shows an illustrative type of computing system that, in some implementations, is used to implement any aspect of the features shown in the foregoing drawings.

The computing system 102 will be described below in greater detail, in generally a top-down manner. The following terminology is relevant to some examples presented below. A "machine-trained model" or "model" refers to computer-implemented logic for executing a task using machine-trained weights that are produced in a training operation. A "weight" refers to any type of parameter value that is iteratively produced by the training operation. A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. A "prompt" refers to a sequence of tokens submitted to a machine-trained model. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIGS. 12 and 13, described below, provide examples of illustrative computing equipment for performing these functions. In the context of the term "component query," the word "component" refers to a portion of the original query 106.

The language model 104 shown in FIG. 1 is any type of generative model that is capable of generating new instances of data, given an instance of input data. A generative model is in contrast to a discriminative model that discriminates among two or more instances of data. In some implementations, the language model 104 specifically functions as a pattern completion engine that operates in an auto-regressive manner, token-by-token. That is, the pattern completion engine includes weights that reflect statistical patterns which have been learned by performing training on a typically large collection of training examples. Given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate. In some implementations, the language model 104 of FIG. 1 uses an attention mechanism to perform its predictions. The attention mechanism determines the relevance between pairs of tokens in the set of input tokens. Additional information regarding one illustrative implementation of the language model 104 is set forth below in connection with the explanation of FIG. 9.

In some examples, all of the functions of the computing system 102 shown in FIG. 1 are implemented in local fashion by one or more local computing devices. Alternatively, or in addition, a server system implements one or more of the functions of the computing system 102. Each user uses a browser application or any other type of application to interact with the functions of the server system.

In some implementations, the computing system 102 as a whole is integrated into a particular application (not shown), including any of a chat engine, a question-answering engine, a search engine, etc. A chat engine engages the user in a conversation over a dialogue having one or more dialogue turns. A question-answering engine performs the focused task of answering a user's question (which is a role also served by the chat engine). A search engine matches a user's input query against a collection of information items of any scope. For example, the collection includes a product database of a particular online merchant or the collective resources of the World Wide Web.

In some implementations, the original query 106 includes a common part 108 and one or more instance-specific parts 110. The common part 108 expresses the main question being posed by the query 106, and the instance-specific parts 110 express different subtopics or subtasks to be explored in answering the question. Analogized to a hierarchy of nodes, the common part 108 is associated with a parent node, and each instance-specific part is associated with a child node. For example, assume that the user' original query 106 contains the tokens "Give me a summary of the prices and performance of top-selling electric vehicles offered by: manufacture W, manufacturer X, manufacturer Y, and manufacturer Z," where an actual query will provide actual manufacturer names in place of manufacturer W, manufacturer X, manufacturer Y, and manufacturer Z. The common part 108 is associated with the text "Give me a summary of the prices and performance of top-selling vehicles offered by." A first instance-specific part is associated with the name "manufacturer W," a second instance-specific part is associated with the name "manufacturer X," and so on.

In some implementations, the computing system 102 performs a matching operation to determine whether the original query 106 is an appropriate candidate for partitioning based a determination of whether the original query 106 includes prescribed key term information and/or conforms to a predetermined syntactical (and/or grammatical) structure and/or satisfies any other predetermined matching condition. Thus, the user invokes parallel processing by writing the original query 106 in a manner that will invoke parallel processing. For example, the computing system 102 determines whether the original query 106 includes a list of the instance-specific parts 110 that begins with a colon, and, if so, invokes parallel processing. Alternatively, the computing system 102 determines whether the user has enclosed a list in special characters (e.g., using the format "< . . . >"), and, if so, invokes parallel processing. The computing system 102 performs the above kinds of matching using a lookup operation, regular expressing matching, semantic-level matching (such as cosine similarity comparison of distributed vectors), and so on. Alternatively, the computer system 102 makes no demands on the user to enter the original query 106 using a particular format. For example, as will be described below, the computer system 102 relies on the language model 104 in this case to make a preliminary determination of whether the original query 106 is a good candidate for parallel processing.

Alternatively, or in addition, the instance-specific parts 110 of the original query 106 originate from source text which accompanies the user's question. The source text is made up of different source parts, at least some of which are relevant to different aspects of the query. The question directly or indirectly asks the language model 104 to answer the original query 106 based, at least in part, on information imparted by the source text. For example, consider the example in which the user's original query 106 is: "Give me a summary of the prices and performance of top-selling electric vehicles based on the attached <datasheets.txt>, for: manufacturer W, manufacturer X, manufacturer Y, and manufacturer Z." The original query 106 also encompasses a document 112 having the file name "datasheets.txt." Further assume that the document 112 is made up of different source parts (114, 116, . . . , 118), some of which are relevant to different topics. For example, the document 112 includes different sections pertaining to the electric vehicles produced by manufacturer W, manufacturer X, manufacturer Y, and manufacturer Z. In whole, the original query 106 asks the language model 104 to perform analysis with respect to the particular companies based on the information imparted by the source document 112 and its own inherent knowledge, which is expressed by its machine-trained weights. Other kinds of source texts include website data (e.g., network-accessible customer review data, product data, or Wikipedia data), message data (e.g., Email data), etc. In some implementations, the user's original query 106 takes the form of performing a search over the search text, or performing a "chat" with the source text.

In some examples, the source parts of the source text refer to scattered portions of a larger body of information. For example, a query specifies that analysis is to be performed on particular record entries (or particular rows of entries), sentences, paragraphs, pages, chapters, etc. of a text document. The selected portions are non-consecutive, meaning that selected portions need not be directly adjacent to each other within the larger body of information (although any two portions can be directly adjacent to each other). In other examples, a source text includes plural consecutive source parts, such as consecutive tokens (or consecutive groups of tokens), data entries, sentences, paragraphs, or pages, etc. "Consecutive" means that each source part is directly adjacent to its preceding source part (if any) and its following source part (if any). A user or automated process selects a contiguous portion of the consecutive source parts, and designates the source parts that make up this portion as respective instance-specific parts. For example, the user or automated process selects pages 10-20 of a 50-page document, and designates each page as a separate instance-specific part.

Alternatively, or in addition, the original query 106 does not explicitly specify particular instance-specific parts. Rather, the computing system 102 relies on a process to expand the original query 106 so that it includes two or more instance-specific parts. For example, assume that the user initially inputs a query "Show me information regarding different aspects of a 2024 vacation to Italy." In some implementations, the computing system 102 invokes the language model 104 to expand this original query 106 to include expected instance-specific parts pertaining to airfare, hotel arrangements, package tours, restaurants, and so on. In some implementations, the computing system 102 is guided by a predetermined hierarchy of topics that users typically explore when planning a vacation. Additional information regarding these functions is set forth below in the description of FIGS. 3, 4, and 8.

Alternatively, or in addition, the computing system 102 is used in a function-calling environment. For example, assume that the common part 108 of the user's original query 106 is "Give me information about the 2023 sales prices of electric vehicles made by U.S. car manufacturers." Further assume that the original query 106 contains or makes reference to a list of function definitions, pertaining to functions that the computing system 102 is capable of invoking to collect the information necessary to answer the question. For example, a first function definition describes a first application programming interface (API) by which the computing system 102 interrogates a first database maintained by manufacturer W, a second function definition describes a second API by which the computing system 102 interrogates a second database maintained by manufacturer X, and a third function definition describes a third API by which the computing system 102 interrogates a third database maintained by manufacturer Y. In this case, the instance-specific parts 110 correspond to different function definitions. As will be described further below, the language model 104 produces information that sets up function calls to these three databases. In other examples, the language model 104 inherently performs a selection operation by producing output information that invokes some available function calls, but not others (depending on the particular question that is being asked).

In general, a function refers to any supplemental action that the computing system 102 is capable of invoking to assist in completing a task. Illustrative actions include calling a database, calling a dedicated machine-trained model, performing a search, interacting with a social network site, and so on. The definition of each function describes the operations that the function performs, the input information (e.g., the parameters) that the function requires to perform its operations, and the output information that the function returns. The language model 104 will not itself invoke a function, but will provide output information that sets up a call to the function. The language model 104 can therefore be said to trigger a function.

Function calling generally involves: sending an original query that specifies a list of one or more functions that the language model 104 is capable of triggering; receiving a response by the language model 104 that specifies invocation information in a particular format associated with a particular function (e.g., a particular API's format); invoking the invocation information to perform the particular function (e.g., by making an API call); obtaining supplemental data (e.g., data obtained from a data store that matches a search condition specified in the API call) as a result of the invocation of the particular function; and optionally utilizing the supplemental data to formulate another query for input to the language model 104. The language model 104 decides whether to trigger a function based on a context specified by an original query (e.g., as expressed in a particular question), and based on the statistical knowledge expressed by its machine-trained weights.

In yet other cases, the computing system 102 modifies the original query 106 into a form that includes parts that are more suitable for processing in an independent fashion. For example, assume that the original query 106 is "Compare the gas mileage of cars A, B, and C." The computing system 102 transforms this query, for instance, into: "Compare the gas mileage of cars: A and B; A and C; and B and C." This is an example in which the computing system 102 performs enumeration to expand a general instruction that calls for "ranking" or "comparing" items into plural component comparisons, each of which is capable of being performed independently of the others. The computing system 102 executes each of the instance-specific parts independent of the other instance-specific parts. Alternatively, or in addition, the computing system 102 relies on a post-processing operation to perform a ranking function (as described more fully below). In some implementations, the computing system 102 decomposes the original query 106 in the above-described manner using any of the functionality set forth below with respect to FIGS. 3 and 4 (e.g., by consulting discrete partitioning rules and/or the language model 104). One discrete rule formalizes the example set forth above, e.g., by specifying that an original query that specifies a comparison among plural items can be partitioned into pairwise component comparisons. More generally, some implementations of the optional decomposition process involve: receiving the original query 106; consulting a reference source (e.g., a discrete rule or the language model 104) to determine whether it is appropriate to reformulate the original query 106; and reformulating the original query 106 in a manner specified by the reference source.

In yet other cases, the language model 104 is a multimodal language model that is capable of analyzing different types of content, including any of text, images, audio, video, etc. Here, the original query 106 includes any non-text data items. For example, consider the case in which the original query 106 reads: "identify which vehicles are classic American-made muscle cars: <image1>, <image2>, <image3>, <image4>, and <image5>." The common part 108 of this original query 106 corresponds to the textual preamble. The instance-specific parts 110 of this original query 106 correspond to the five different images. However, to facilitate explanation, the following explanation will mainly focus on examples in which the original query 106 is composed entirely of text tokens.

In some implementations, a submitting device 120 receives the original query 106. For instance, the submitting device 120 corresponds to any type of user computing device. Examples of common mobile devices include a smartphone, a laptop computing device, a tablet-type computing device, a wearable computing device, a mixed reality computing device and so on. Examples of non-mobile devices includes a desktop personal computing device, a game console, a media device, etc.

A prompt-compiling component 122 partition the original query 106 into plural component queries. In the specific example of FIG. 1, the prompt-compiling component 122 produces a component query that includes the identified common part 108 of the original query 106 and one of the instance-specific parts 110 of the original query. FIG. 1 specifically shows that the prompt-compiling component 122 produces at least a first component query 124 that includes the common part 108 and a first instance-specific part 114, a second component query 126 that includes the common part 108 and a second instance-specific part 116, and a third component query 128 that includes the common part 108 and a third instance-specific part 118.

In some implementations, the prompt-compiling component 122 associates a common identifier (e.g., ID1) that is used to identify all of the components queries (124, 126, ..., 128) that pertain to the same original query 106. In some examples, the prompt-compiling component 122 optionally also attaches an identifier (not shown) to each component query that specifies an order in which an instance-specific part associated with the component query occurs in the original query 106 and/or the source text.

The prompt-compiling component 122 performs one or more subtasks in the course of partitioning the original query 106 into the component queries (124, 126, ..., 128). These subtasks will be described more fully in connection with the explanation of FIGS. 3 and 4. By way of overview, in some implementations, these subtasks include any of: (a) determining whether the original query 106 includes predetermined characteristics that indicate that the original query 106 is capable of being partitioned into the plural component queries (124, 126, ..., 128) (such as predetermined key terms and/or semantic concepts and/or syntactic/grammatical constructions); (b) partitioning the original query 106 into the common part 108 and plural instance-specific parts 110; (c) determining which candidate instance-specific parts should be used to compose the component queries (124, 126, . . . , 128), which is a task that, in some examples, includes ranking the importance of the candidate instance-specific parts; (d) assigning the component queries (124, 126, . . . , 128) to one or more processors, and so on.

Assume that a decision is made to send the component queries (124, 126, . . . , 128) to a particular processor 130 that is used to implement the language model 104, among one or more other processors 132. In some implementations, a processor refers to one or more hardware processing units of any kind, such as one or more graphics processing units (GPUs), and/or one or more neural processing units (NPUs), and/or one or more application-specific processing units. In other words, a processor has a one-to-one correspondence with a specific hardware processing unit, or is an abstraction that refers to two or more hardware processing units.

Further assume that each processor, in whatever manner implemented, includes logic for processing queries in parallel via separate instantiations of the language model 104. Each such instantiation is referred to herein as a processor instance. FIG. 1 specifically shows an example in which the processor 130 includes processor instances (134, 136, . . . , 138). GPUs provide an architecture that is particularly suited for parallel processing using threads and parallel processing units (e.g., Streaming Multiprocessors (SMs)).

The processor instances (134, 136, . . . , 138) interact with a shared cache memory 140. The cache memory 140 stores information produced in the course of processing queries. For example, the cache memory 140 stores at least key-value (KV) information 142 that is generated in the course of performing an attention operation, upon the submission of queries. The explanation of FIG. 9 will provide additional information regarding the meaning and role of the KV information 142 in a typical transformer-based language model pipeline. The processor 130 adds and removes data items to/from the cache memory 140 on a first-in-first-out (FIFO) basis. That is, the processor 130 stores a newly calculated item by discarding the oldest existing item in the cache memory 140.

Assume that the prompt-compiling component 122 specifically distributes the first component query 124 to the first processor instance 134, the second component query 124 to the second processor instance 136, and the third component query 128 to the third processor instance 138. Each processor instance uses a pipeline of processing steps (described below with reference to FIG. 9) to transform its component query into a component-query response, one token at a time. For example, the first processor instance 134 transforms the first component query 124 into a first component-query response 144, the second processor instance 136 transforms the second component query 126 into a second component query-response 146, and the third processor instance 138 transforms the third component query 128 into a third query-component response 148. Each processor instance associates its component-query response with the common identifier of the original query 106, here, ID1, and optionally a sequence ID (which specifies the position of the associated instance-specific part in the original query 106).

Each component-query response conveys information that depends on the nature of the component query. For example, assume that the common part 108 of the first component query 124 reads: "Give me a summary of the prices and performance of top-selling electric vehicles based on the attached <data sheets.txt>." The instance-specific part 114 is the name of company "W," combined with a portion of the file "datasheets.txt" that pertains to the company W. The processor instance 114 generates the component-query response 144 based on the information imparted by the first component query 124 and its internal knowledge expressed by its weights. The component-query response 144 identifies the performance and prices of the company W's vehicles. In other examples, the component-query response 144 takes the form of a function call to a database maintained by the company W.

More generally, in some examples, the size of the original query 106 is relatively large, as is the total number of the tokens that make up the component-query responses (144, 146, . . . , 148). This might be the case, for example, when each component-query response provides summary information. In other examples, the total number of tokens in the component-query responses (144, 146, . . . , 148) is relatively small in comparison to a size of the original query 106. This is generally the case when the component-query responses (144, 146, . . . , 148) contain information that sets up one or more function calls.

A post-processing component 150 generates a final response 152 based on the individual component-query responses (144, 146, . . . , 148), each of which are delivered one token at a time. In some examples, the post-processing component 150 performs this task by assembling the individual component-query responses (144, 146, . . . , 148) based on the order of their corresponding instance-specific parts (114, 116, . . . , 118) in the original query 106. Mathematically expressed, the final response 152 in this scenario is: $R=R_{ID1}=U_i^m LLM(P^c+P_i^d)$. $P^c$ refers to the common part 108, and $P_i^d$ refers to the $i^{th}$ instance-specific part. LLM(•) refers to the component-query response 144 that is produced by transforming a concatenation of the common part 108 and the instance-specific part using the language model 104. $U_{i=1}^m(•)$ refers to the union (e.g., concatenation) of m instance-specific parts 110.

Alternatively, or in addition, the post-processing component 150 performs post-processing operations that synthesize the component-query responses (144, 146, . . . , 148) in other ways. Illustrative synthesizing tasks include any of: (a) comparing the component-query responses (144, 146, . . . , 148) based on any specified criteria, which involve ranking the component-query responses (144, 146, . . . , 148); (b) selecting a subset of the component-query responses (144, 146, . . . , 148) based on any specified criteria; (c) extracting information items from the component-query responses (144, 146, . . . , 148), and so on.

Alternatively, or in addition, the post-processing component 150 instructs the prompt-compiling component 122 to perform a second stage of processing based on a new series of component queries. This second stage of processing is triggered by information in the previous query (here, the original query 106) and/or information conveyed by the component-query responses (144, 146, . . . , 148). FIG. 1 illustrates this operation as a feedback path 154. For example, assume that the first component-query response 144 generally describes the performance of vehicles made by the company W. The prompt-compiling component 122 consults rules and/or the language model 104 to generate a next series of component queries that seek further information regarding different aspects of performance, such as miles-per-charge, safety, and handling in turns. In some examples, the new series of component queries can be viewed as having a child relationship to at least one component-query response. Although not explicitly mentioned in the examples to follow, any subsequent component query sent to the language model 104 (in the course of answering the original query 106) can incorporate historical context information, e.g., by including at least some previous tokens sent to the language model 104 in one or more prior submissions. For example, these prior tokens can describe the common part 108 of the original query 106. To serve this end, the prompt-compiling component 122 has access to a data store (not shown) that stores the previous tokens. The prompt-compiling component 122 forwards the new component queries to the processor instances (134, 136, . . . , 138), to generate a new collection component-query responses. The computing system 102 is capable of repeating this type of derivative query generation and processing for any number of iterations. By doing so, the computing system 102 follows an exploration trajectory that progressively moves down a hierarchy of topics, constrained, at least in part, by a predetermined ontology of available topics. Additional information regarding this mode of operation is set forth below in connection with the explanation of FIG. 8.

Alternatively, or in addition, the component-query responses (144, 146, . . . , 148) contains invocation information that triggers the post-processing component 150 to invoke other functions or services implemented by one or more other systems 156. For example, a component-query response contains a uniform resource locator (URL) link to another resource. Alternatively, a component-query response includes an API call to another resource, configured in the specific format of that API. A user or automated process activates this link or executes the API call to interact with the other resource. For instance, assume that the original query 106 broadly asks about a travel package to Europe. Further assume that the original query 106 contains or makes reference to a list of function definitions associated with functions that are capable of being invoked to answer the user's question. For example, assume that the functions are calls to an airfare-related database, a lodging-related database, and a tour-related database. The processor instances (134, 136, . . . , 138) are instructed to generate API calls to these three databases. The post-processing component 150 then invokes these API calls.

In still other implementations, the previous two embodiments are combined. For example, assume that the post-processing component 150 automatically invokes an API call specified in a component-query response to interrogate a hotel database to retrieve supplemental information regarding lodging in Italy within a timeframe of interest to the user. The prompt-compiling component 122 generates a next set of component queries that depend, in part, on the supplemental information extracted from the hotel database. In other words, the supplemental information extracted from the hotel database serves a role akin to the source document 112 that is used in an initial phase of a search (in some examples). In some cases, the follow-up component queries include or make reference to another set of function definitions. These function definitions describe functions that are capable of being invoked in answering a follow-up question.

In some examples, an entity which administers the prompt-compiling component 122 and the post-processing component 150 is separate from an entity which administers the language model 104. In other examples, a single entity administers all functions performed by the computing system 102.

Figure 2:
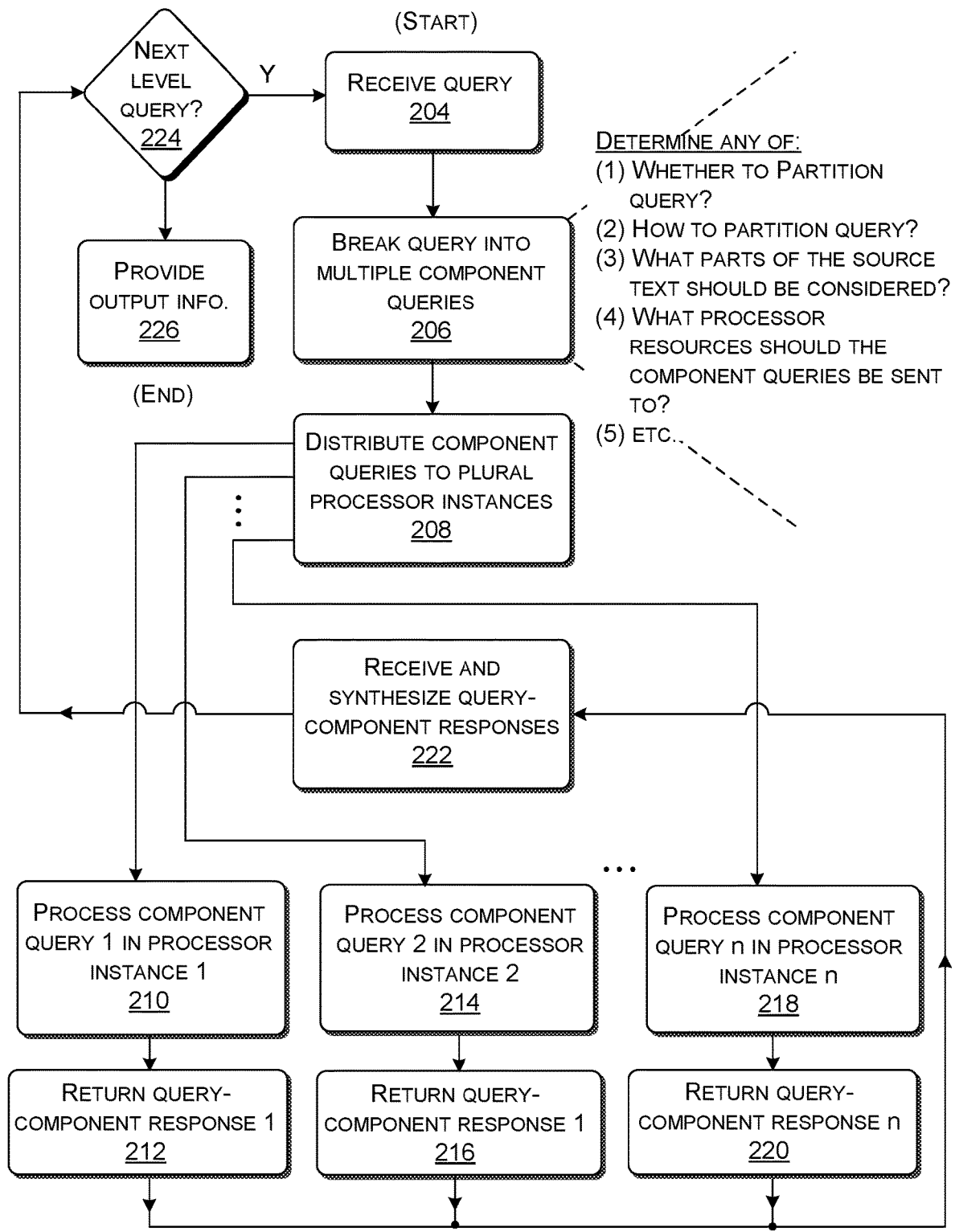
FIG. 2 shows a process that represents one manner of operation of the computing system of FIG. 1.

FIG. 2 is a process 202 that summarizes the above-described functions in flowchart form. In block 204, the submitting device 120 receives the original query 106, expressed in any form(s), such text provided by a text input device, and/or audio input provided by a microphone. In block 206, the prompt-compiling component 122 partitions the original query 106 into plural component queries (124, 126, . . . , 128). In some implementations, this process includes various subtasks, including any of: (a) determining whether the original query 106 should be partitioned; (b) determining how to partition the original query 106; (c) determining what instance-specific parts of the source text (if any) should be included in the component queries (124, 126, . . . , 128); and/or (d) determining what processor resources should be used to process the component queries (124, 126, . . . , 128). If the first determination (a) is answered in the negative, then the computing system 102 processes the original query 106 in a standard manner, that is, without partitioning it into plural parts that are cable of being processed in parallel.

With respect to last determination (d) in block 206, assume that a decision is made to allocate most of the component queries (124, 126, . . . , 128) to a single processor. But assume that the single processor has a current workload that cannot accommodate working on all of the component queries (124, 126, . . . , 128) in parallel. In this case, the prompt-compiling component 122 allocates as many component queries (124, 126, . . . , 128) to the single processor (e.g., the processor 130) as possible, before assigning component queries to a second processor. This allocation process is repeated for the second processor. The prompt-compiling component 122 memorializes each assignment of a component query to a particular processor by attaching identifier information that identifies this resource. As will be described below, in making allocation decisions, the prompt-compiling component 122 also compares the tokens that make up the component queries (124, 126, . . . , 128) with the data currently stored in the cache memories of available processors.

In block 208, the prompt-compiling component 122 distributes the component queries (124, 126, . . . , 128) to appropriate processor instances, e.g., the processor instances (134, 136, . . . , 138). In block 210, the first processor instance 134 produces the first component-query response 144 based on the component query 124. In block 212, the first processor instance 134 returns the component-query response 144. In block 214, the second processor instance 136 produces the second component-query response 146 based on the second component query 126. In block 216, the second processor instance 134 returns the second component-query response 146. In block 218, the third processor instance 138 produces the third component-query response 148 based on the third component query 128. In block 220, the third processor instance 138 returns the third component-query response 148. Note that the operations of blocks 210 and 212 occur in parallel with the operation of blocks 214 and 216, and blocks 218 and 220.

In block 222, the post-processing component 150 receives the component-query responses (144, 146, . . . , 148). The post-processing component 150 also performs any post-processing actions on the component-query responses (144, 146, . . . , 148). In some examples, the post-processing actions involve combining (e.g., concatenating) the component-query responses (144, 146, . . . , 148) together in the order in which the instance-specific parts 110 are arranged in the original query 106. Alternatively, or in addition, the post-processing component 150 performs any analysis on the component-query responses (144, 146, . . . , 148), which involves any of a comparing operation, ranking operation, extracting operation, classifying operation, etc.

In block 224, the post-processing component 150 determines whether it is appropriate to conduct a follow-up query on the basis of the component-query responses (144, 146, ..., 148) and/or on the basis of the original query 106. In some examples, the post-processing component 150 makes this decision based on a determination of whether the component-query response(s) received from the language model 104 contains a direct response to the original query 106, or whether the component-query responses(s) provides intermediary results that require further exploration/processing to answer the original query 106. For example, the post-processing component 150 is configured to interpret a component-query response that contains an API call as an intermediary result because the API call itself does not provide an answer to the original query 106. More generally, in some implementations, the post-processing component 150 makes post-processing decisions using any of the functionality set forth below with respect to FIGS. 5 and 6 (e.g., by consulting discrete rules and/or the language model 104). If block 224 is answered in the affirmative, then the processing flow advances to block 206, in which the prompt-compiling component 122 produces or receives a next set of component queries. As previously explained, in some cases, the new component queries also incorporate information mined from the one or more of the other system(s) 156, e.g., in response to execution of a function.

Although not shown in FIG. 2, at any stage, the computing system 102 is capable of asking the user to confirm submitted information, and/or supply additional information. In some implementations, the computing system 102 asks the user to provide additional information when it cannot parse a submitted query with sufficient confidence. In some implementations, the computing system 102 asks the user to confirm whether it should perform a follow-on search.

If block 224 is answered in the negative, then, in block 226, the post-processing component 150 generates output information based on all of the component-query responses received in one or more response-generating cycles. The post-processing component 150 provides the output information to the user in any form(s), such as a user interface presentation to be presented on a display device, and/or audio information to be delivered via a speaker. Alternatively, the post-processing component 150 generates and presents output information in stages, as it is produced in different iterations of the process 202 shown in FIG. 2.

FIG. 3 shows an implementation of a prompt-compiling component 302 that relies on a set of rules and/or, for at least some tasks, task-specific machine-trained models 304, labeled in FIG. 3 as "dedicated" models to indicate that they are trained to perform particular tasks. The rules encompass any of discrete rules (e.g., discrete IF-THEN rules), algorithms, equations, etc. In some examples, a developer or end-user manually creates these rules. The task-specific machine-trained models perform task-specific analysis, such as determining whether it is appropriate to split the original query 106 into the component queries (124, 126, ..., 128). One classification model for performing this kind of task is the BERT model described in Devlin, et al., "BERT: Pre-training of Deep Bidirectional Transformers for Language Understanding," arXiv, arXiv:1810.04805v2 [cs.CL], May 24, 2019, 16 pages. The BERT model uses a transformer-based model to transform a string of input tokens into respective output embeddings. The string of input tokens includes a special "CLS" token as the first-occurring token, and can include other special tokens (such as "SEP" tokens that separate different parts of the input tokens). A classification component maps the output embeddings to a classification result. Alternatively, the classification component transforms only the output embedding that is the counterpart of the "CLS" token to a classification result. In some implementations, the classification component is implemented by a single-layer or multi-layer feed-forward neural network of any type (e.g., a multilayer perceptron (MLP)) followed by a Softmax component (otherwise known as a normalized exponential function).

The prompt-compiling component 302 performs one or more tasks, such as any of: (a) determining whether it is appropriate to partition the original query 106 into component queries; (b) determining how to partition the original query 106 into the parts; (c) determining what part(s) of a source text (if any) should be included in creating component queries; and (d) determining what processor resources should be assigned to process the component queries.

Task (a): Determining whether it is appropriate to partition the original query 106 into parts. In some implementations, the prompt-compiling component 302 makes this determination based on prescribed information that is included in the original query 106, such as a list expressed in a predetermined format (e.g., as series of items or function names, separated by commas, surrounded by brackets (e.g., "< . . . >"). Alternatively, or in addition, the prompt-compiling component 302 makes a partitioning decision based on whether or not a user has added a prescribed flag (e.g., {Partition=Yes}) to the original query 106. In other cases, the prompt-compiling component 302 uses any type of classification component to produce an output result that conveys a probability that it is appropriate to partition the original query 106 into parts. For example, a BERT-based classification model maps input tokens associated with the original query 106 to an output embedding that is the counterpart of the CLS token included in the input tokens. A classification component maps the output embedding into a binary decision of whether or not the original query 106 is capable of being partitioned.

Task (b): How to partition the original query 106. The prompt-compiling component 302 makes this decision using any discrete parsing rules implemented by a parsing engine. For example, the prompt-compiling component 302 applies a rule that involves extracting the terms within a list that are separated by commas or other special characters, and treating those terms as the instance-specific parts 110. The prompt-compiling component 302 identifies the remainder of the text in the original query as the common part 108. Alternatively, or in addition, the prompt-compiling component 302 uses a classification model, such as the BERT model, to assign a score to each word in a query. The score identifies the probability that the word corresponds to the common part 108 or a particular instance-specific part. In other implementations, the computing component 302 relies on a conditional random fields (CRFs) model to associate tags with the tokens of the original query.

Task (c): Determining what source parts should be used in the component queries. In some implementations, the prompt-compiling component 302 determines what source parts to include by determining the lexical and/or semantic similarity between each candidate source part and the common part 108. For example, the prompt-compiling component 302 computes a term frequency-inverse document frequency (TF-IDF) score for each candidate source part that expresses its similarity to the common part 108. Alternatively, or in addition, the prompt-compiling component 302 generates a first distributed vector associated with the candidate source part and a second distributed vector associated with the common part 108, and then determines the distance between the first distributed vector and the second distributed vector (e.g., using semantic similarity). A passage of text is mapped to a distributed vector using a neural network of any type. Finally, the prompt-compiling component 302 chooses the source parts that are assessed as being the greatest relevance to the common part 108; in some implementations, these source parts correspond to the parts having the highest scores.

In addition, or alternatively, the prompt-compiling component 302 applies environment-specific rules to identify the most relevant source parts. In one case, an application provides a predetermined list of source-part topics (and associated terms) that are considered relevant, and source-part topics (and associated terms) that are considered less relevant. When presented with a particular original query 106, the prompt-compiling component 302 chooses any sources parts that match entries on the list of relevant topics.

Task (d): Determining how to allocate component queries to available processors. In some implementations, the prompt-compiling component 302 relies on environment-specific rules to make this determination. For example, the prompt-compiling component 302 applies a rule that involves allocating as many component queries to the single processor that has the largest free capacity to process queries at the present time. Upon filling up the work queue of that processor, the prompt-compiling component 302 allocates remaining component queries to the processor having the second-greatest free capacity at the present time, and then, when that process is full, to a processor having the third-greatest free capacity at the present time, and so on.

Alternatively, or in addition, the prompt-compiling component 302 assigns component queries to the processor having a cache memory that stores data that is most relevant to the component queries. For example, the prompt-compiling component 302 assigns the component queries to the processor that has recently processed tokens that match the common part 108 of the current original query 106 (and/or that match at least some of the instance-specific parts 110); this processor will have KV information in its cache memory that need not be recomputed. In addition, or alternatively, the prompt-compiling component 302 uses other algorithms to perform its routing function, such as consistent hashing.

The above-described functions are not exhaustive of the types of operations that are capable of being performed by the prompt-compiling component 302. As explained above, in some cases, the prompt-compiling component 302 rewrites the original query 106 so that it is more readily suited for parallel processing (e.g., by expanding a general instruction to rank a set of items to separate requests to compare respective pairs of items in the set of items). Alternatively, or in addition, the prompt-compiling component 302 automatically expands a general term (e.g., "travel") into parts (e.g., "rental car," "airline," and "lodging." In some implementations, the prompt-compiling component 302 performs this operation based on a predetermined expansion rule (e.g., that specifies that "travel" should be expanded into "rental car," "airline," and "lodging").

FIG. 4 shows a prompt-compiling component 402 that relies on the same language model 104 used in the flow of FIG. 1 and/or a different more specialized language model (not shown). In either case, the language model 104 is a generative model that predicts tokens based on a submitted prompt. The language model 104 performs this task by recursively creating a response to the input tokens that conforms to prior patterns that the language model 104 has encountered in training examples in a training phase (where those patterns are captured by the language model's weights). In one approach, the prompt-compiling component 402 sends a preliminary seed or system prompt to the language model 104 that describes a specific task that the language model 104 will be subsequently asked to perform. The prompt-compiling component 402 then sends the original query 106 to the language model 104 for analysis. That is, the original query 106 can be included as a suffix to the instruction, or as a separate submission to the language model 104.

The prompt-compiling component 402 performs any of the tasks described above with respect FIG. 3. For example, with respect to the first of the above-mentioned tasks, the prompt-compiling component 402 submits a seed prompt that instructs the language model 104 to discriminate between queries that include mutually exclusive items that are capable of being processed in parallel, and queries that lack this structure. The seed prompt also specifies the format that the language model 104 is to use to report its conclusion. In some implementations, the seed-prompt also includes one or more examples of queries that are appropriately partitioned, and those which cannot. One such example specifies: "Give me a summary of the graduate school tuition for: Stanford, Cornell, and UVA. {Partition=Yes}." Another example specifies: "Give me a summary of the how to assemble this device that includes components A, B, and C. {Partition=No}." The former original query is a good candidate for partitioning because it invokes analysis that is not interdependent. The later original query is a poor candidate for partitioning because, despite is grammatical resemblance to the first original query, its focus is not on parts in isolation, but on their complex relationship within an overriding device. The language model 104 relies on its ability to understand language to correctly carry out the instructions in the seed prompt. Alternatively, or in addition, the language model is fine-tuned to perform specific tasks, such as determining whether an original query should be partitioned.

In other cases, the prompt-compiling component 402 relies on calls to the language model 104 to determine any of: (a) how to parse the original query 106; (b) how to rewrite the original query 106 into a form that is more suited for parallel processing; (c) how to expand the original query 106 so that it includes additional instance-specific parts; (d) how to rank the relevance of instance-specific parts, and so on.

FIG. 5 shows a post-processing component 502 that relies on discrete rules and/or a task-specific (also referred to as "dedicated") classification models 504. The post-processing component 502 applies these rules and/or classification models 504 to determine any of: (a) what component-query responses should be retained in the final response 152; (b) how the component-query responses should be combined or otherwise synthesized; and (c) what other post-solution actions (if any) should be performed on the basis of the component-query responses.

Task (a): Determining what component queries should be retained. Assume that the language model 104 associates a confidence score with each component-query response that specifies a probability that the response is an appropriate answers to the original query. Alternatively, or in addition, the post-processing component 502 uses a classification model (such as the BERT model) to transform a combination of the original query 106 and a candidate component-query response to an output score that reflects an extent to which the candidate component-query response answers the original query 106. In either case, the post-processing component 502 applies a rule that specifies that all component-query responses having confidence scores above a prescribed threshold level should be included in the final response 152, or just the most relevant N component-query responses (in which N is determined parameter selected for use in a particular environment).

Tasks (b) and (c): Determining how the component-query responses are to be combined in the final response 152 and what other post-solution actions should be taken. In some implementations, the post-processing component 502 includes any type of matching functionality that determines if one or more key terms (predetermined keywords, symbols, flags, etc.) and/or predetermined semantic concepts are present in the original query 106, which are associated with different types of post-processing actions to be performed on the component-query responses. Illustrative matching functionality includes lookup mechanisms (e.g., which make reference to a list of predetermined key terms), regular expression matching, semantic matching, etc. For example, assume that the original query 106 asks for a "summary" or "digest" associated with a list of instance-specific parts. Alternatively, or in addition, assume that the original query 106 includes a special flag, e.g., "{Process=Concatenate}". When the matching functionality detects one of these triggering words or flags, the post-processing component 502 concatenates the candidate-query responses in the same order in which the instance-specific parts associated with the candidate-query responses occur in the original query 106. In other cases, assume that the original query 106 asks the computing system 102 to rank information imparted by the candidate-query responses, e.g., by using terms such as "rank" or "show me the best," and/or by using the special flag "{Process=Rank}". When the matching functionality detects one of these triggering words or flags, the post-processing component 502 orders the query-component responses based on their confidence scores that are computed in any of the ways specified above. In other cases, assume that the original query 106 includes terms such as "extract" or "pick out," or the special flag {"Process=Extract"}. When the matching functionality detects one of these triggering words or flags, the post-processing component 150 extracts information from the component-query responses that includes the topics-of-interest (e.g., as expressed by specified terms and/or as confirmed by semantic analysis). Alternatively, or in addition, the component-query responses themselves include control information that governs how the component-query responses are to be processed. For example, the component-query responses include function calls and/or instructions to submit a follow-up query to the language model 104. When the matching functionality detects this control information, the post-processing component 502 invokes context-specific actions, e.g., by calling a function specified by an API call provided in a component-query response.

FIG. 6 shows a post-processing component 602 that performs any of the above tasks by interacting with the language model 104 and/or a specialized language model (not shown) that is fine-tuned to perform specific tasks. The post-processing component 602 operates in generally the same manner as the prompt-compiling component 402 of FIG. 4. That is, the post-processing component 602 submits a seed prompt to the language model 104 that instructs the language model 104 how it is to process queries. The post-processing component 602 follows the seed prompt with the original query 106.

Figure 7:
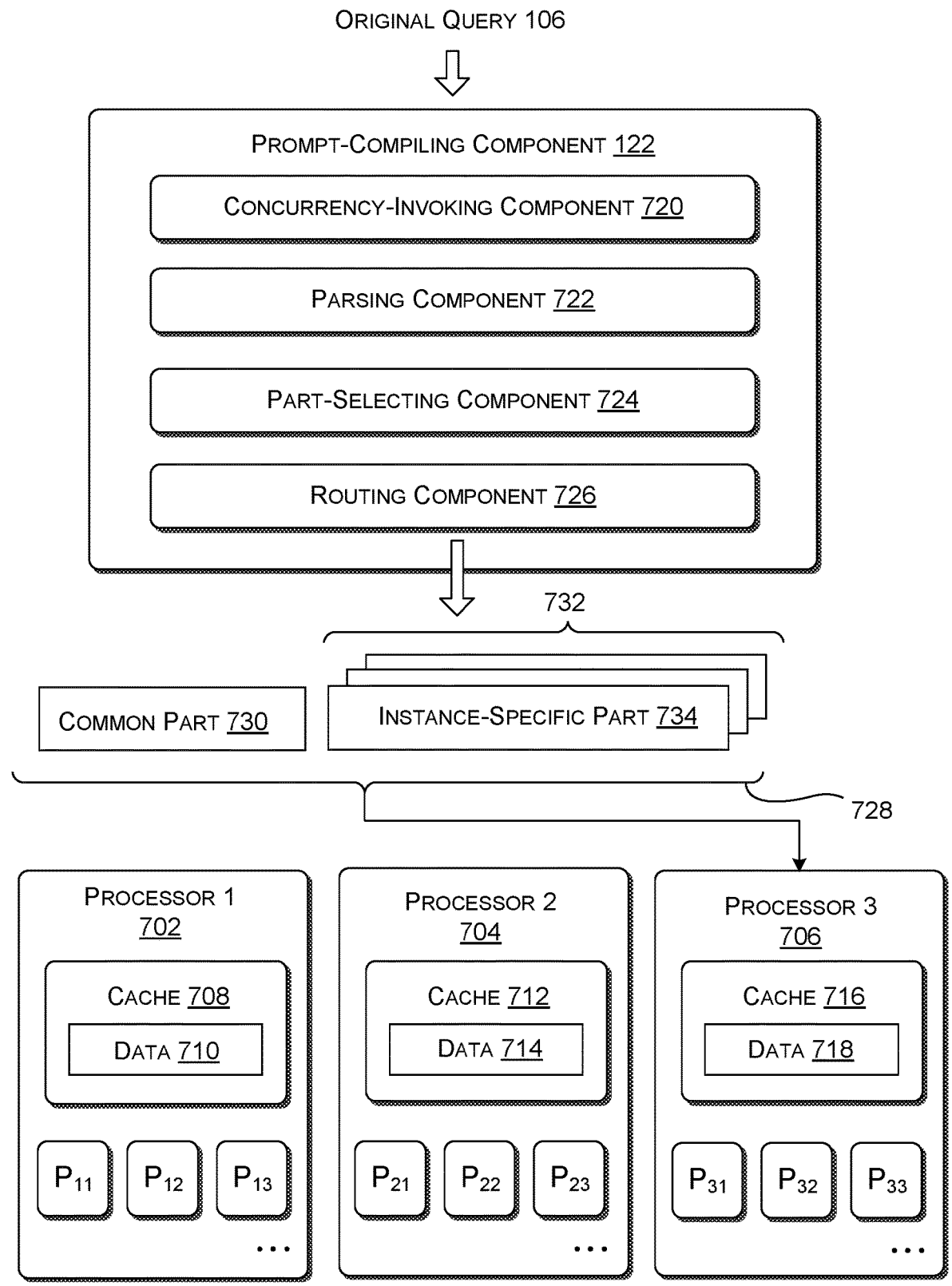
FIG. 7 shows a strategy for allocating a group of component queries to a processor. The processor hosts processor instances that interact with a shared cache memory.

FIG. 7 shows plural processors (702, 704, 706), each of which hosts plural processor instances. For example, the processor 702 hosts processor instances P11, P12, and P13, etc. As previously explained, any individual processor is implemented by one or more hardware units, such as one or more GPUs, and/or one or more NPUs, and/or one or more application-specific hardware units. The processor instances of the processor 702 have access to a cache memory 708, which stores data 710 at a current time. The processor instances of the processor 704 have access to a cache memory 712, which stores data 714 at a current time. The processor instances of the processor 706 have access to a cache memory 716, which stores data 718 at a present time. In some examples, each cache memory is an L1 and/or L2 cache that is integrated with a processor (e.g., a GPU) and/or memory that is separate from the processor; each cache memory provides quick access to any type of data that is used by the processor in performing its operations. In the present context, the data refers to all token information input to the language model 104 and the intermediary and final results produced by the language model 104. In other examples, two or more separate processors share a single cache memory of the language model 104.

In some implementations, the prompt-compiling component 122 includes separate submodules for performing the kinds of respective compiling-related functions described above with reference to FIGS. 3 and 4. In some implementations, for example, the prompt-compiling component 122 includes at least: a concurrency-invoking component 720 for determining whether an original query should be partitioned into plural component queries; a parsing component 722 for parsing the original query into a common part and plural instance-specific parts; a part-selecting component 724 for selecting a subset of the instance-specific parts that are most relevant to the common part; and a routing component 726 for determining how to allocate the component queries to the processors (702, 704, . . . , 706). Two ways of implementing these functions are set forth above with respect to the explanation of FIGS. 3 and 4. Further note that this list of functions is non-exhaustive; other implementations include additional functions and/or omit one or more of the functions set forth above.

Assume that the prompt-compiling component 122 produces component queries 728, which include a common part 730 and different instance-specific parts 732, including a representative instance-specific part 734. In some implementations, the routing component 726 performs prefix matching to find the processor having a cache memory that stores information that is most pertinent to at least the beginning tokens of the common part 730. In the specific example shown in FIG. 7, assume that the routing component 726 determines that it is most appropriate to send as many of the component queries 728 as possible to the third processor 704 because its cache memory 716 stores information that indicates that it has previously processed at least a beginning part of the current original query (such as the common part 730 or a portion thereof). Further, because the third processor 706 has previously processed at least initial tokens of the current query, the cache memory 716 also likely stores KV information associated with those previously-processed input tokens. The third processor 706 is therefore able to forgo the task re-computing this KV information. More specifically, a particular processor instance of the third processor 706 (e.g., P31) begins processing the particular component query that is given to it at the first token which has no previously-stored counterpart in the cache memory 716. Allocating component queries to a processor having relevant information in its cache memory is beneficial because doing so reduces the use of processing resources and expedites the amount of time required to process the component queries 728.

In some implementations, the routing component 726 performs prefix matching by comparing tokens in the submitted query with the tokens represented by the cache memories (708, 712, . . . , 716). In other implementations, the routing component 726 performs prefix matching by referencing an internal table which serves as a record of token streams that have been previously processed by the different processors (702, 704, . . . , 706). The routing component 726 maintains this table.

Alternatively, assume that no processor stores a prefix that is relevant to the component queries 728. The computing system 102 still leverages the parallel processing architecture of a processor to reduce the use of resources and reduce latency to the greatest extent possible. For example, with respect to the processor 706, its processor instances P31, P32, and P33 operate independently, and may generate query-component responses at different times (e.g., due to different instance-specific workload constraints and differing makeup the individual component queries 728). As such, it is possible, for instance, that processor instance P31 will generate KV information for the common part 730 prior to the processor instance P32 or the processor instance P33. In this case, the processor instances P32 and P33 reuse the already-calculated KV information, without recalculating it. Each processor instance performs this function by checking the cache memory 716 prior to each calculation. The processor instance will only perform a calculation if it encounters a cache miss. In connection therewith, note that each processor instance works in an auto-regressive manner, one token at a time; thus, the above determinations are made on a token by token basis.

In an alternative implementation, the routing component 726 orchestrates the processing of the component queries 728 in two phases. In a first phase, the routing component 726 selects a processor to process just the common part 730 of the query based on any of the factors previously described (e.g., by selecting the processor having the greatest availability, and/or the processor which has the best latency-related performance, and/or the processor having a cache memory which stores information that is most relevant to the common part 730). Assume that the routing component 726 again selects the third processor 706. The routing component 726 then instructs the processor instances of the third processor 706 to process the full component queries 728. The processor instances need not re-compute the KV information for the common part 730, since it has been previously computed and is available in the cache memory 716. In other words, each processor instance can begin processing its component query at the instance-specific part.

According to another technical advantage, the routing component 726 is able to more efficiently "pack" or fill up the work queue of a processor by partitioning a large original query into the smaller component queries 728. This is because it is easier for the routing component 726 to find a processor with free capacity to handle a smaller component query compared to the larger original query. A processor is also less likely to encounter a timeout period or other error condition by processing smaller component queries. Nor is the total latency at which the computing system 102 delivers the final response 152 made entirely dependent on the work done by a single processor instance.

Figure 8:
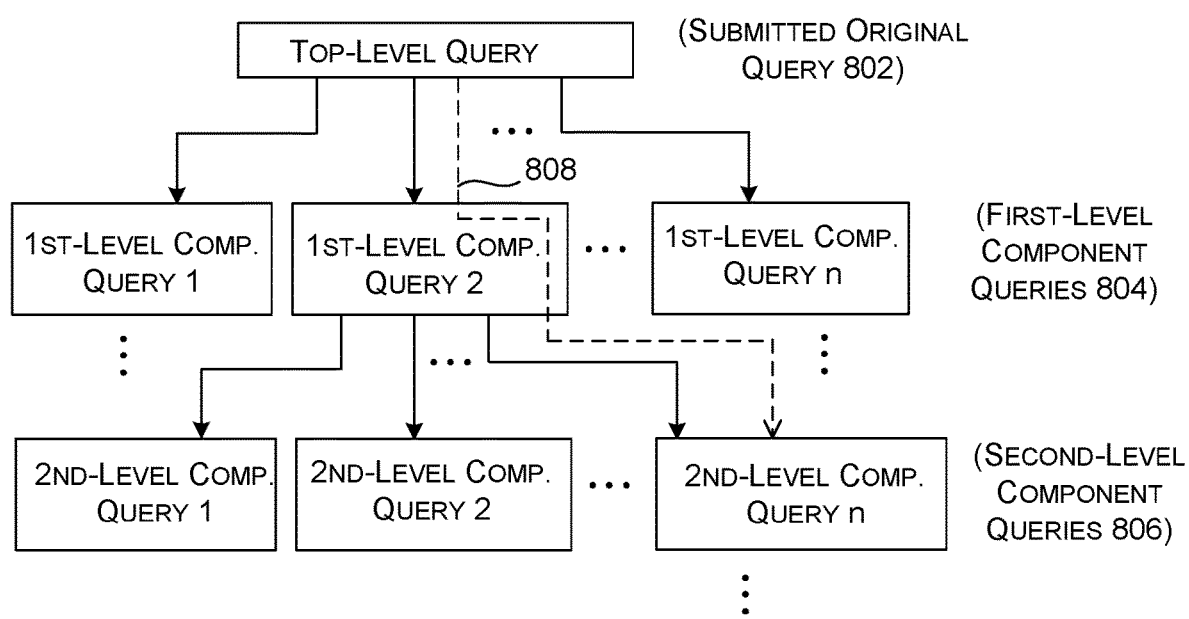
FIG. 8 shows a strategy for answering a user's query by successively submitting collections of component queries of narrowing focus to the processor instances.

FIG. 8 shows an example that summarizes the capability of the computing system 102 that enables it to successively process sets of queries pertaining to topics of narrowing focus. For example, in a first stage, the prompt-compiling component 122 partitions an original query 802) into plural first-stage component queries 804. In a second stage, assume that the prompt-compiling component 122 generates another set of component queries 806. In some examples, the prompt-compiling component 122 produces the second-set of component queries 806 by expanding a topic in a particular component-query response and/or its associated instance-specific part in the original query. In some examples, the prompt-compiling component 122 also consults a predetermined hierarchy of topics to determine how to advance from one set of component queries to another. For example, a predetermined hierarchy specifies that a parent topic that pertains to a particular product leads to follow-up queries regarding products that are commonly used in conjunction with that product. In the example of FIG. 8, the computing system 102 progressively advances through the hierarchy along an illustrative trajectory 808.

Note that, at each stage, the language model 104 is asked to analyze a limited number of subtopics. The language model 104 performs this function with greater accuracy and in less time compared to the task of selecting from an entire collection of subtopics (associated with leaf nodes of the hierarchy) at the outset. The language model 104 is able to perform this function with greater accuracy because it is given a smaller context to analyze at each step, which affords less opportunity for misinterpretation.

In the particular context of a function-calling application, assume that the preexisting hierarchy of topics pertains to a hierarchy of functions that are capable of being invoked at different stages of a task. In a first phase of a task, the prompt-compiling component 122 generates a first set of component queries that describe a first set of functions. The processor instances produce output information that sets up calls to one or more of the first set of functions. In a second phase of the task, the prompt-compiling component 122 generates a second set of component queries that specify a second set of functions. The processor instances produce output information that sets up calls to one or more of the second set of functions. The second set of functions can be considered as child nodes to at least one of the first set of functions. The language model 104 is able to efficiently and accurately process each series of component queries because its focus of attention is restricted to a consideration of only some of a complete list of available functions at any given phase, not the entire list at one time.

Consider an example in which a user seeks to find a house within his budget and then obtain a mortgage. In a first phase, the prompt-compiling component 122 creates component queries that ask the language model 104 to set up calls to three real estate search sites, guided by the user's original query. The post-processing component 150 invokes these searches to collect sale-related data. In a second phase, the prompt-compiling component 122 creates component queries that ask the language model 104 to set up calls to three banks, based on the sale-related data collected in the first phase and the user's original query. The post-processing component 150 invokes these searches to collect mortgage-related data. This process continues for any number of phases. A final phase provides an answer to the user's query.

Figure 9:
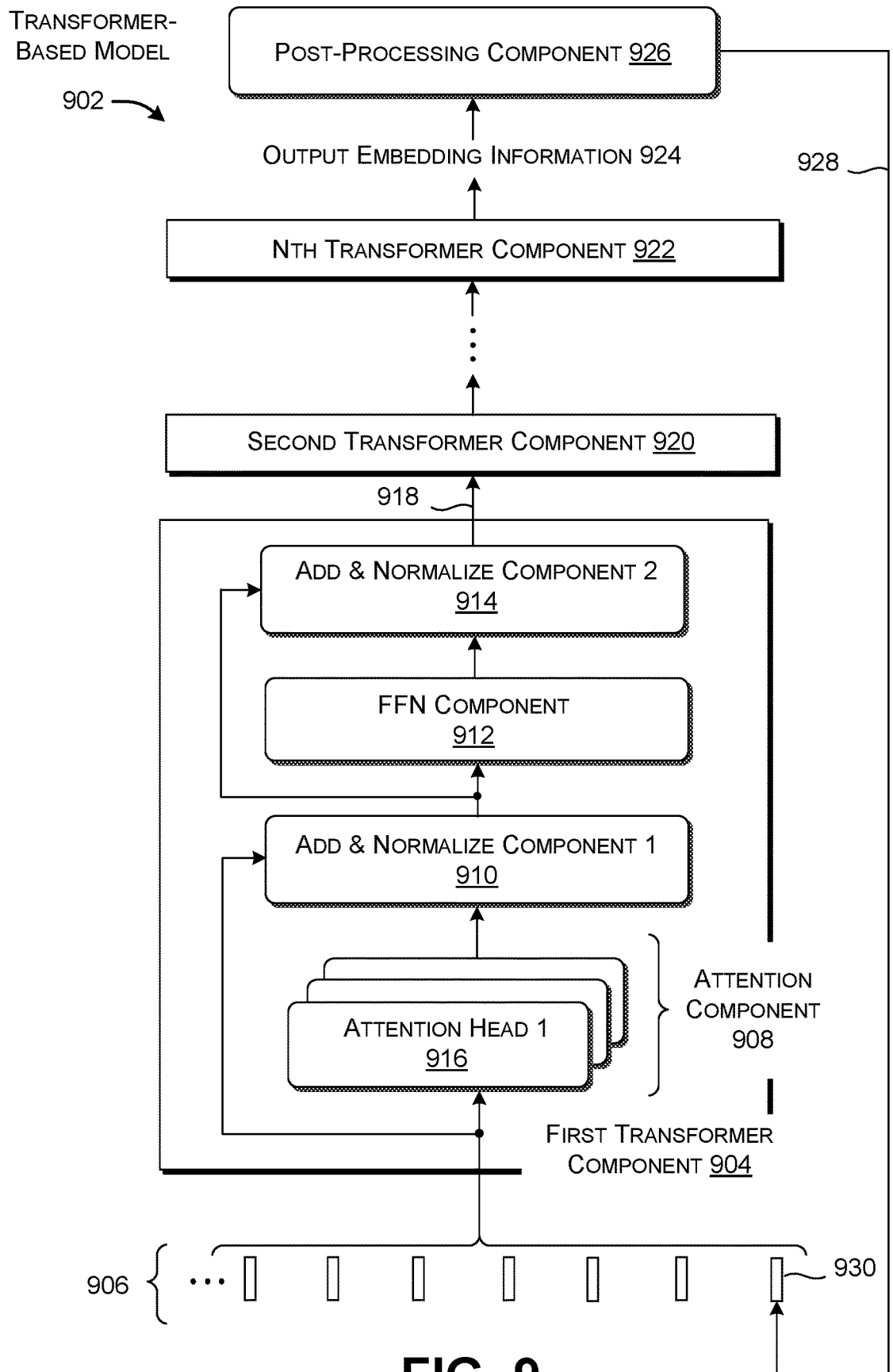
FIG. 9 shows an illustrative language model for implementing various functions of the computing system of FIG. 1.

FIG. 9 shows a transformer-based language model ("language model") 902 for implementing the language model 104 referenced by FIG. 1. In some implementations, the language model 902 is also used to implement a BERT-based classification model, which, in turn, is used in the prompt-compiling component 302 of FIG. 3 and/or the post-processing component 502 of FIG. 5. The language model 902 is composed, in part, of a pipeline of transformer components, including a first transformer component 904. FIG. 9 provides details regarding one way to implement the first transformer component 904. Although not specifically illustrated, other transformer components of the language model 902 have the same architecture and perform the same functions as the first transformer component 904 (but are governed by separate sets of weights).

The language model 902 commences its operation with the receipt of input information, such as a passage of text. The prompt includes a series of linguistic tokens. In some examples, a "token" refers to a unit of text having any granularity, such as an individual word, a word fragment produced by byte pair encoding (BPE), a character n-gram, a word fragment identified by the WordPiece or Sentence-Piece algorithm, etc. To facilitate explanation, assume that each token corresponds to a complete word. The principles set forth herein, however, are not limited to the processing of text information; in other examples, the language model 902 operates on any of: audio information, image information, video information, sensor information, and so on, or any combination thereof. In some implementations, the tokens associated with an image are respective n×m pixel portions of the image.

Next, an embedding component (not shown) maps the sequence of tokens into respective token embeddings. For example, with respect to text-based tokens, the embedding component produces one-hot vectors that describe the tokens, and then maps the one-hot vectors into the token embeddings using a machine-trained linear transformation. The embedding component converts image-based tokens into token embeddings using any type of neural network, such as a convolutional neural network (CNN). The embedding component then adds position information (and, in some cases, segment information) to the respective token embeddings to produce position-supplemented embedding vectors 906. The position information added to each token embedding describes the embedding vector's position in the sequence of token embeddings.

The first transformer component 904 operates on the position-supplemented embedding vectors 906. In some implementations, the first transformer component 904 includes, in order, an attention component 908, a first add-and-normalize component 910, a feed-forward neural network (FFN) component 912, and a second add-and-normalize component 914.

The attention component 908 determines how much emphasis should be placed on parts of input information when interpreting other parts of the input information. Consider, for example, a sentence that reads: "I asked the professor a question, but he could not answer it." When interpreting the word "it," the attention component 908 will determine how much weight or emphasis should be placed on each of the words of the sentence. The attention component 908 will find that the word "question" is most significant.

The attention component 908 performs attention analysis using the following equation:

$$\text{Attention}(Q, K, V) = \text{softmax}\left(\frac{QK^T}{\sqrt{d_k}}\right)V. \quad (1)$$

The attention component 908 produces query information Q by multiplying the position-supplemented embedding vectors 906 by a query weighting matrix $W^Q$. Similarly, the attention component 908 produces key information K and value information V by multiplying the position-supplemented embedding vectors 906 by a key weighting matrix $W^K$ and a value weighting matrix $W^V$, respectively. To execute Equation (1), the attention component 908 takes the dot product of Q with the transpose of K, and then divides the dot product by a scaling factor √d, to produce a scaled result. The symbol d represents the dimensionality of Q and K. The attention component 908 takes the Softmax (normalized exponential function) of the scaled result, and then multiplies the result of the Softmax operation by V, to produce attention output information. More generally stated, the attention component 908 determines how much emphasis should be placed on each part of input embedding information when interpreting other parts of the input embedding information, and when interpreting the same part. In some cases, the attention component 908 is said to perform masked attention insofar as the attention component 908 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 9 shows that the attention component 908 is composed of plural attention heads, including a representative attention head 916. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 908 concatenates the output results of the attention component's separate attention heads, and then multiplies the results of this concatenation by another weight matrix $W^O$.

The add-and-normalize component 910 includes a residual connection that combines (e.g., sums) input information fed to the attention component 908 with the output information generated by the attention component 908. The add-and-normalize component 910 then normalizes the output information generated by the residual connection, e.g., by layer-normalizing values in the output information based on the mean and standard deviation of those values, or by performing root-mean-squared normalization. The other add-and-normalize component 914 performs the same functions as the first-mentioned add-and-normalize component 910. The FFN component 912 transforms input information to output information using a feed-forward neural network having any number of layers.

The first transformer component 904 produces output embedding information 918. A series of other transformer components (920, . . . , 922) perform the same functions as the first transformer component 904, each operating on output embedding information produced by its immediately preceding transformer component. Each transformer component uses its own level-specific set of machine-trained weights. The final transformer component 922 in the language model 902 produces final output embedding information 924.

In some implementations, a post-processing component 926 performs post-processing operations on the final output embedding information 924. For example, the post-processing component 926 performs a machine-trained linear transformation on the final output embedding information 924, and processes the results of this transformation using a Softmax component (not shown). The language model 902 uses the output of the post-processing component 926 to predict the next token in the input sequence of tokens. In some applications, the language model 902 performs this task using a greedy selection approach (e.g., by selecting the token having the highest probability), or by using the beam search algorithm (e.g., by traversing a tree that expresses a search space of candidate next tokens).

In some implementations, the language model 902 operates in an auto-regressive manner, as indicated by the loop 928. To operate in this way, the language model 902 appends a predicted token to the end of the sequence of input tokens, to provide an updated sequence of tokens. The predicted token leads to the production of a new position-supplemented vector 930. In a next pass, the language model 902 processes the updated sequence of position-supplemented vectors to generate a next predicted token. The language model 902 repeats the above process until it generates a specified stop token.

In other implementations, the post-processing component 926 represents a classification component that produces a classification result. In some implementations, the classification component is implemented by using a fully-connected feed-forward neural network having one or more layers followed by a Softmax component. A BERT-type model relies on this type of classification component. In some implementations, a BERT-type model operates by mapping a set of input tokens to a set of output embeddings in a single pass (not in the auto-recursive manner described in the preceding paragraph).

The above-described implementation of the language model 902 relies on a decoder-only architecture. Other implementations of the language model 902 use an encoder-decoder transformer-based architecture. Here, a transformer-based decoder receives encoder output information produced by a transformer-based encoder, together with decoder input information. The encoder output information specifically includes KV information that serves as input to the attention components of the decoder (except the first transformer component).

In some implementations, the language model 902 is a general-purpose, publicly-available, pre-trained language model. One such model is described in Touvron, et al., "LLaMA: Open and Efficient Foundation Language Models," ar Xiv, arXiv: 2302.13971v1 [cs.CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv: 2211.05100v2 [cs.CL], Dec. 11, 2022, 62 pages.

In other examples, the pre-trained language model is further fine-tuned to process queries in the context of the computing system 102 of FIG. 1. For instance, the pre-training of a generative language model includes unsupervised training using language modeling (e.g., predicting the next word in a given text passage and comparing the prediction with the actual next word) and supervised training (e.g., predicting an output result and comparing the prediction with a ground-truth result). Background on the general task of pre-training generative language models is provided in Radford, et al., "Improving Language Understanding by Generative Pre-training," OpenAI, San Francisco California, Jun. 11, 2018, 12 pages. In some implementations, the classification component used in the BERT model is trained based on a task-specific collection of training examples.

Consider, for example, the fine-tuning of the language model 104 to operate in the context of the computing system 102 of FIG. 1. Each positive training example in a training corpus specifies: a component query that, in turn, is a part of an original query; and a response to the component query that is considered correct. A training system (not shown) iteratively updates weights of the language model 104 to minimize differences between model-generated responses and ground-truth responses (which are given by the training corpus). The differences are expressible, for instance, using a cross entropy loss function. The training system updates the weights using stochastic gradient descent in combination with back propagation. In other examples, as mentioned above, a general-purpose language model is used without pre-training it.

Next consider the task in which a classification component (e.g., a BERT-based classification model) determines whether an original query should be partitioned. In some implementations, a training system trains the classification component using supervised training on a set of training examples, each of which specifies an illustrative original query and a label that indicates whether or not it is appropriate to partition the original query. The training system uses any loss function, such as cross entropy, to compute loss information, which reflects the difference between model-computed labels and ground-truth labels. The training system updates the weights of the classification component based on the loss information using stochastic gradient descent in combination with back propagation.

Dedicated classification models for other of the above-described functions of the prompt-computing component 122 and/or the post-processing component 150 rely on a similar supervised or semi-supervised training approach. For a particular function, that approach includes: (1) generating a labeled set of training examples, each of which includes an instance of input information, an instance of output information, and an indication of whether the output information represents a correct or incorrect transformation of the input information, pursuant to the particular function; and (2) training a dedicated classification model based on those training examples.

For example, consider a classification model that performs a parsing function, e.g., by mapping each word in an original query to a score that indicates whether the word is associated with an instance-specific part or a common part. To train such a model, a training system relies on a set of training examples, each of which specifies an original query and tags that indicate the correct interpretation of words in the original query. Next consider a classification model that determines how to synthesize a set of component-query responses. To train such a model, a training system relies on a set of training examples, each of which specifies a set of component-query responses and a label that designates an action to take based on the content of the component-query responses. Illustrative actions include concatenation, ranking, extracting, etc.

Other implementations of the language model 902 use other kinds of machine-trained models besides, or in addition to, the particular transformer-based architecture shown in FIG. 9. The other machine-trained models include any of CNNs, recursive neural networks (RNNs), fully-connected feed-forward neural networks (FFNS), stable diffusion models, etc., or any combination thereof.

In some implementations, the cache memory 140 (of FIG. 1) stores input tokens associated with an input query and the KV information computed using Equation (1), based on the input tokens. Assume that the routing component 726 (of FIG. 7) concludes that a component query under consideration matches at least part of previously-encountered tokens stored in the cache memory 140. If so, the language model 902 omits the operation of computing the KV information for these previously-encountered tokens, insofar as the cache memory 140 stores this KV information. The language model 902 will commence its operation when a token is encountered that has no counterpart in the cache memory 140.

Figure 10:
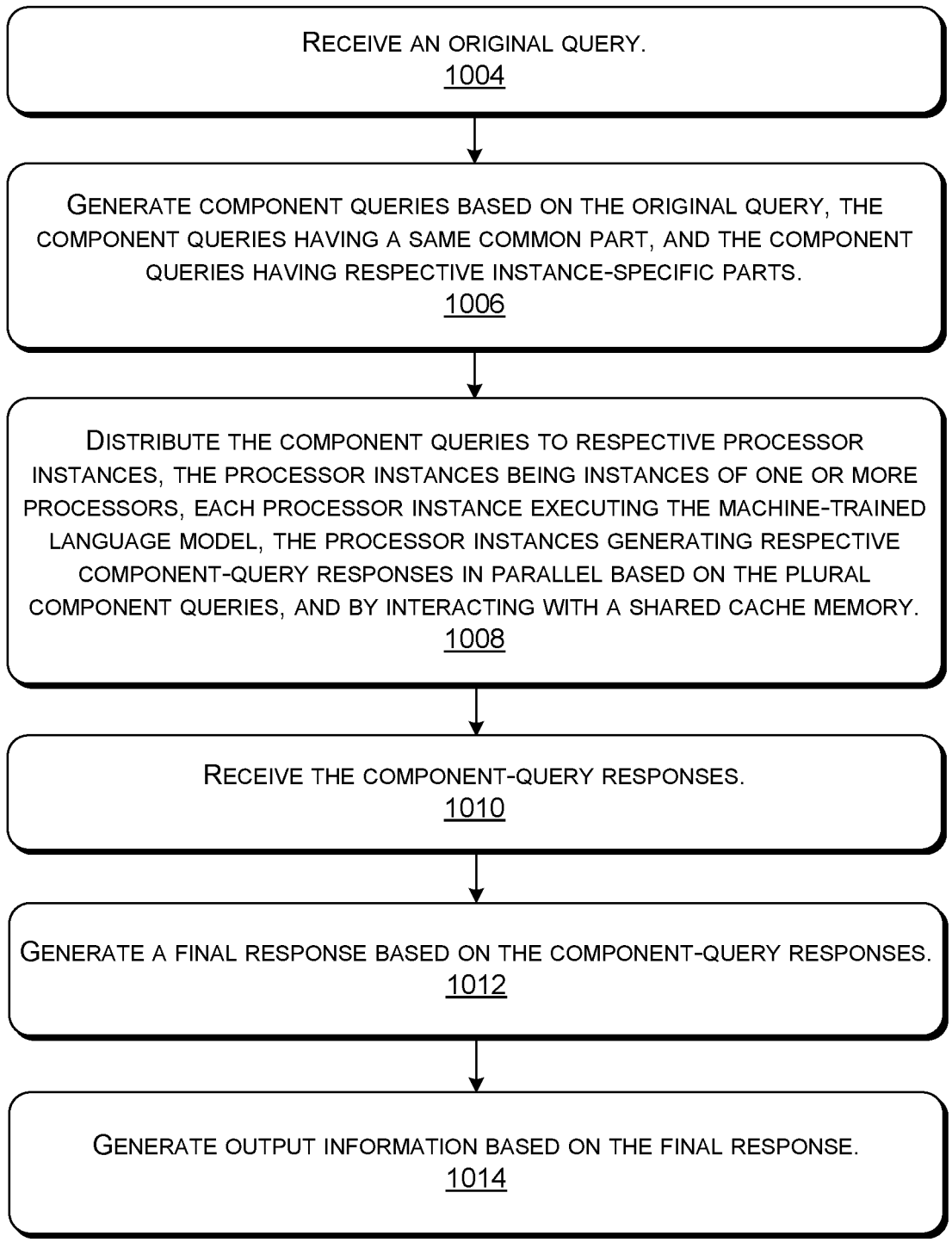
FIG. 10 is a flowchart that provides an overview of one manner of operation of the computing system of FIG. 1.

FIGS. 10 and 11 show two processes that represent an overview of the operation of the computing system of FIG. 1. Each of the processes is expressed as a series of operations performed in a particular order. But the order of these operations is merely representative, and the operations are capable of being varied in other implementations. Further, any two or more operations described below is capable of being performed in a parallel manner. In one implementation, the blocks shown in the processes that pertain to processing-related functions are implemented by the computing equipment described in connection with FIGS. 12 and 13.

More specifically, FIG. 10 shows a process 1002 for processing a query using a machine-trained language model (e.g., the language model 104). In block 1004, the computing system 102 receives an original query (e.g., the original query 106). In block 1006, the computing system 102 generates component queries (e.g., the component queries (124, 126, . . . , 128)) based on the original query, the component queries having a same common part (e.g., the common part 108), and the component queries having respective instance-specific parts (e.g., the instance-specific parts 110). In block 1008, the computing system 102 distributing the component queries to respective processor instances (e.g., the processor instances (134, 136, . . . , 138). The processor instances are instances of one or more processor (e.g., the processor 130). Each processor instance executes an instance of the machine-trained language model. The processor instances generate respective component-query responses (e.g., the component-query response (144, 146, . . . , 148) in parallel based on the plural component queries, and by interacting with a shared cache memory (e.g., the cache memory 140). In block 1010, the computing system 102 receives the component-query responses. In block 1012, the computing system 102 generates a final response (e.g., the final response 152) based on the component-query responses. In block 1014, the computing system 102 generates output information based on the final response.

FIG. 11 shows a process 1102 that summarizes one manner of operation of the prompt-compiling component 122. In block 1104, the prompt-compiling component determines that a question and a source text (e.g., the source document 112) are capable of being partitioned into component queries (e.g., the component queries (124, 126, . . . , 128). In block 1106, the prompt-compiling component 122 generates the component queries based on the question and the source text, the component queries having a same common part (e.g., the common part 108) that expresses the question, and the component queries expressing respective selected source parts of the source text.

FIG. 12 shows computing equipment 1202 that, in some implementations, is used to implement the computing system 102. The computing equipment 1202 includes a set of local devices 1204 coupled to a set of servers 1206 via a computer network 1208. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1208 is implemented as a local area network, a wide area network (e.g., the Internet), one or more point-to-point links, or any combination thereof.

The bottom-most overlapping box in FIG. 12 indicates that the functionality of the computing system 102 is capable of being spread across the local devices 1204 and/or the servers 1206 in any manner. In one example, the computing system 102 is entirely implemented by a local device. In another example, the functions of the computing system 102 are entirely implemented by the servers 1206. Here, a user is able to interact with the servers 1206 via a browser application running on a local device. In other examples, some of the functions of the computing system 102 are implemented by a local device, and other functions of the computing system 102 are implemented by the servers 1206. In some implementations, for instance, the language model 104 is implemented by the servers 1206, and the remainder of the functions of the computing system 102 are implemented by each local device.

FIG. 13 shows a computing system 1302 that, in some implementations, is used to implement any aspect of the mechanisms set forth in the above-described figures. For instance, in some implementations, the type of computing system 1302 shown in FIG. 13 is used to implement any local computing device or any server shown in FIG. 12. In all cases, the computing system 1302 represents a physical and tangible processing mechanism.

The computing system 1302 includes a processing system 1304 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1302 also includes computer-readable storage media 1306, corresponding to one or more computer-readable media hardware units. The computer-readable storage media 1306 retains any kind of information 1308, such as machine-readable instructions, settings, model weights, and/or other data. In some implementations, the computer-readable storage media 1306 includes one or more solid-state devices, one or more hard disks, one or more optical disks, etc. Any instance of the computer-readable storage media 1306 uses any technology for storing and retrieving information. Further, any instance of the computer-readable storage media 1306 represents a fixed or removable unit of the computing system 1302. Further, any instance of the computer-readable storage media 1306 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1302 utilizes any instance of the computer-readable storage media 1306 in different ways. For example, in some implementations, any instance of the computer-readable storage media 1306 represents a hardware memory unit (such as random access memory (RAM)) for storing information during execution of a program by the computing system 1302, and/or a hardware storage unit (such as a hard disk) for retaining/archiving information on a more permanent basis. In the latter case, the computing system 1302 also includes one or more drive mechanisms 1310 (such as a hard drive mechanism) for storing and retrieving information from an instance of the computer-readable storage media 1306.

In some implementations, the computing system 1302 performs any of the functions described above when the processing system 1304 executes computer-readable instructions stored in any instance of the computer-readable storage media 1306. For instance, in some implementations, the computing system 1302 carries out computer-readable instructions to perform each block of the processes described with reference to FIGS. 10 and 11. FIG. 13 generally indicates that hardware logic circuitry 1312 includes any combination of the processing system 1304 and the computer-readable storage media 1306.

In addition, or alternatively, the processing system 1304 includes one or more other configurable logic units that perform operations using a collection of logic gates. For instance, in some implementations, the processing system 1304 includes a fixed configuration of hardware logic gates, e.g., that are created and set at the time of manufacture, and thereafter unalterable. In addition, or alternatively, the processing system 1304 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1304 effectively incorporates a storage device that stores computer-readable instructions, insofar as the configurable logic units are configured to execute the instructions and therefore embody or store these instructions.

In some cases (e.g., in the case in which the computing system 1302 represents a user computing device), the computing system 1302 also includes an input/output interface 1314 for receiving various inputs (via input devices 1316), and for providing various outputs (via output devices 1318). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1320 and an associated graphical user interface presentation (GUI) 1322. The display device 1320 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1302 also includes one or more network interfaces 1324 for exchanging data with other devices via one or more communication conduits 1326. One or more communication buses 1328 communicatively couple the above-described units together.

The communication conduit(s) 1326 is implemented in any manner, e.g., by a local area computer network, a wide area computer network (e.g., the Internet), point-to-point connections, or any combination thereof. The communication conduit(s) 1326 include any combination of hardwired links, wireless links, routers, gateway functionality, name servers, etc., governed by any protocol or combination of protocols.

FIG. 13 shows the computing system 1302 as being composed of a discrete collection of separate units. In some cases, the collection of units corresponds to discrete hardware units provided in a computing device chassis having any form factor. FIG. 13 shows illustrative form factors in its bottom portion. In other cases, the computing system 1302 includes a hardware logic unit that integrates the functions of two or more of the units shown in FIG. 13. For instance, in some implementations, the computing system 1302 includes a system on a chip (SoC or SOC), corresponding to an integrated circuit that combines the functions of two or more of the units shown in FIG. 13.

The following summary provides a set of illustrative examples of the technology set forth herein.

(A1) According to one aspect, a method (e.g., the process 1002) is described for processing a query using a machine-trained language model (e.g., the language model 902). The method includes: receiving (e.g., in block 1004) an original query (e.g., the original query 106); generating (e.g., in block 1006) component queries (e.g., the component queries 124, 126, . . . , 128) based on the original query, the component queries having a same common part (e.g., the common part 108), and the component queries having different respective instance-specific parts (e.g., the instance-specific parts 110); distributing (e.g., in block 1008) the component queries to respective processor instances (e.g., the processor instances 134, 136, . . . , 138), the processor instances being instances of one more processors (e.g., the processor 130), each of the processor instances executing the machine-trained language model, the processor instances generating respective component-query responses (e.g., the component-query responses 144, 146, . . . , 148) in parallel based on the plural component queries, and by interacting with a shared cache memory (e.g., the cache memory 104); receiving (e.g., in block 1010) the component-query responses; generating (e.g., in block 1012) a final response (e.g., the final response 152) based on the component-query responses; and generating (e.g., in block 1014) output information based on the final response.

(A2) According to some aspects of the method A1, the original query includes a question and source text, the source text serving as context for use by the language model in answering the question. The instance-specific parts are associated with respective selected source parts of the source text.

(A3) According to some aspects of the method A2, the selected source parts are a subset of the source text that are collectively less than an entirety of the source text.

(A4) According to some aspects of the method A2, the source text includes plural consecutive source parts (e.g., consecutive pages, paragraphs, entries), and the selected source parts include a contiguous portion of the plural consecutive source parts.

(A5) According to some aspects of the method A2, the selected source parts are automatically selected based on a determination that the selected source parts have a greatest relevance to the question.

(A6) According to some aspects of any of the methods A1-A5, the method further includes assigning a common query identifier to the component queries, and the component-query responses are associated with the common query identifier.

(A7) According to some aspects of any of the methods A1-A6, the method determines whether it is appropriate to partition the original query into the component queries by determining whether the original query includes a predetermined key term (and/or a predetermined semantic concept) and/or matches a predetermined structure (e.g., a predetermined syntactical and/or grammatical structure).

(A8) According to some aspects of any of the methods A1-A7, the generating a final response includes assembling the component-query responses into the final response in an order in which the component queries appear in the original query.

(A9) According to some aspects of any of the methods A1-A8, the generating a final response includes comparing information imparted by at least two of the component-query responses, and generating an output result that expresses a result of the comparing.

(A10) According to some aspects of any of the methods A1-A9, the method further includes detecting a predetermined key term and/or a predetermined semantic concept in the original query and/or the component query responses. The generating a final response is controlled based on the key term and/or semantic concept that has been detected by the detecting.

(A11) According to some aspects of any of the methods of A1-A10, the method further includes determining that at least one of the component-query responses includes: invocation information associated with a particular function; invoking the particular function; and receiving supplemental data in response to the invoking.

(A12) According to some aspects of any of the methods A1-A11, the method further includes: automatically generating additional component queries based on at least one of the component-query responses, the additional component queries having a child relationship with respect to the at least one of the component-query responses; and instructing the plural processor instances to generate another set of component-query responses based on the additional component queries.

According to some implementations of the method of A12, the additional component queries include supplemental data obtained in response to invoking a particular function, the particular function being invoked in response to invocation information provided by the component-query responses.

(A14) According to some aspects of any of the methods A1-A13, the method includes selecting the one or more processors from among a group of candidate processors based on a determination that the original query contains tokens that have been previously processed by the one or more processors.

(A15) According to some aspects of any of the methods A1-A14, the processor instances generate respective component-query responses based, in part, on intermediate results previously generated by the machine-trained language model and stored in the cache memory.

(A16) According to some aspects of the method A15, the previously generated intermediate results are key-value information used in performing an attention operation in the machine-trained language model.

In yet another aspect, some implementations of the technology described herein include a computing system (e.g., the computing system 1302) that includes a processing system (e.g., the processing system 1304) having a processor. The computing system also includes a storage device (e.g., the computer-readable storage media 1306) for storing computer-readable instructions (e.g., the information 1308). The processing system executes the computer-readable instructions to perform any of the methods described herein (e.g., any individual method of the methods of A1-A16).

In yet another aspect, some implementations of the technology described herein include a computer-readable storage medium (e.g., the computer-readable storage media 1306) for storing computer-readable instructions (e.g., the information 1308). A processing system (e.g., the processing system 1304) executes the computer-readable instructions to perform any of the operations described herein (e.g., the operations in any individual method of the methods of A1-A16).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the phrase "configured to" encompasses various physical and tangible mechanisms for performing an identified operation. The mechanisms are configurable to perform an operation using the hardware logic circuitry 1312 of FIG. 13. The term "logic" likewise encompasses various physical and tangible mechanisms for performing a task. For instance, each processing-related operation illustrated in the flowcharts of FIGS. 10 and 11 corresponds to a logic component for performing that operation.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing a query using a machine-trained language model, comprising:
   receiving an original query;
   generating component queries based on the original query, the component queries having a same common part, and the component queries having different respective instance-specific parts;
   distributing the component queries to respective processor instances, the processor instances being instances of one or more processors, each processor instance executing an instance of the machine-trained language model,
   the processor instances generating respective component-query responses in parallel based on the plural component queries, and based on intermediate results previously generated by the machine-trained language model and stored in a cache memory, the previously generated intermediate results including key-value information used in performing an attention operation in the machine-trained language model;
   receiving the component-query responses;
   generating a final response based on the component-query responses; and
   generating output information based on the final response.
2. The method of claim 1,
   wherein the original query includes a question and source text, the source text serving as context for use by the language model in answering the question, and
   wherein the instance-specific parts are associated with respective selected source parts of the source text.
3. The method of claim 2, wherein the selected source parts are a subset of the source text that are collectively less than an entirety of the source text.
4. The method of claim 2, wherein the source text includes plural consecutive source parts, and wherein the selected source parts include at least a contiguous portion of the plural consecutive source parts.
5. The method of claim 2, wherein the selected source parts are automatically selected based on a determination that the selected source parts have a greatest relevance to the question.
6. The method of claim 1, further comprising assigning a common query identifier to the component queries, wherein the component-query responses are associated with the common query identifier.
7. The method of claim 1, further comprising determining whether it is appropriate to partition the original query into the component queries by determining whether the original query includes a predetermined key term and/or a predetermined semantic concept, and/or matches a predetermined structure.
8. The method of claim 1, wherein the generating a final response comprises assembling the component-query responses into the final response in an order in which the component queries appear in the original query.
9. The method of claim 1, wherein the generating a final response comprises comparing information imparted by at least two of the component-query responses, and generating an output result that expresses a result of the comparing.
10. The method of claim 1, further comprising detecting a predetermined key term and/or a predetermined semantic concept in the original query and/or the component query responses, wherein the generating a final response is controlled based on the key term and/or semantic concept that has been detected by the detecting.
11. The method of claim 1, further comprising: determining that at least one of the component-query responses includes invocation information associated with a particular function; invoking the particular function; and receiving supplemental data in response to the invoking.
12. The method of claim 1, wherein the method further comprises:
   automatically generating additional component queries based on at least one of the component-query responses, the additional component queries having a child relationship with respect to said at least one of the component-query responses; and
   instructing the plural processor instances to generate another set of component-query responses based on the additional component queries.
13. The method of claim 12, wherein the additional component queries include supplemental data obtained in response to invoking a particular function, the particular function being invoked in response to invocation information provided by the component-query responses.
14. The method of claim 1, further comprising selecting the one or more processors from among a group of candidate processors based on a determination that the original query contains tokens that have been previously processed by the one or more processors.
15. A computing system for processing a query using a machine-trained language model, comprising:
   an instruction data store for storing computer-readable instructions; and
   a processing system for executing the computer-readable instructions in the data store, to perform operations including:

receiving an original query that includes a question and source text;

determining that the original query is capable of being partitioned into component queries;

in response to the determining, generating the component queries based on the question and the source text, the component queries having a same common part that expresses the question, and the component queries expressing respective selected source parts of the source text;

distributing the component queries to respective processor instances, the processor instances being instances of one or more processors, each processor instance executing an instance of the machine-trained language model, the processor instances generating respective component-query responses in parallel based on the plural component queries, and based on previously-generated intermediary results stored in a shared cache memory of the one or more processors, the previously-generated intermediate results including key-value information used in performing an attention operation in the machine-trained language model;

receiving the component-query responses;

generating a final response based on the component-query responses; and generating output information based on the final response.

16. The computing system of claim 15, wherein the determining that the query is capable of being partitioned involves determining whether the original query includes a predetermined key term and/or a predetermined semantic concept, and/or matches a predetermined structure.

17. A computer-readable storage medium for storing computer-readable instructions, a processing system executing the computer-readable instructions to perform operations, the operations comprising each of:

receiving an original query that includes a question and a separate source text that accompanies the question and is separate therefrom, the question containing a reference to the source text, the source text including plural source parts that serve as context for use by a machine-trained language model in answering the question;

upon determining that the original query is severable into independent parts, generating component queries based on the original query, the component queries having a same common part, and the component queries expressing respective selected source parts of the plural source parts;

distributing the component queries to respective processor instances, the processor instances being instances of one or more processors, each processor instance executing an instance of the machine-trained language model, the processor instances auto-regressively generating respective component-query responses in parallel based on the plural component queries;

receiving the component-query responses;

generating a final response based on the component-query responses; and generating output information based on the final response.

18. The computer-readable storage medium of claim 17, wherein the selected source parts are a subset of the source text that are collectively less than an entirety of the source text.

19. The computer-readable storage medium of claim 18, wherein the operations further include automatically selecting the source parts from the source text based on a determination that the source parts have a greatest relevance to the question.

20. The computer-readable storage medium of claim 17, wherein the processor instances generate the respective component-query responses based, in part, on intermediate results previously generated by the machine-trained language model and stored in a cache memory, the previously generated intermediate results including key-value information used in performing an attention operation in the machine-trained language model.

* * * * *